United States Patent
Johnson

(10) Patent No.: US 8,882,997 B2
(45) Date of Patent: *Nov. 11, 2014

(54) WASTEWATER TREATMENT METHOD AND APPARATUS

(75) Inventor: Raymond Ford Johnson, White Oak, TX (US)

(73) Assignee: Tervita Corporation, Calgary (CA)

( * ) Notice: Subject to any disclaimer, the term of this patent is extended or adjusted under 35 U.S.C. 154(b) by 682 days.

This patent is subject to a terminal disclaimer.

(21) Appl. No.: 13/046,410

(22) Filed: Mar. 11, 2011

(65) Prior Publication Data

US 2011/0163017 A1 Jul. 7, 2011

Related U.S. Application Data

(60) Division of application No. 12/025,523, filed on Feb. 4, 2008, now Pat. No. 7,906,023, which is a (Continued)

(51) Int. Cl.
*B01D 61/14* (2006.01)
*B01D 63/00* (2006.01)
(Continued)

(52) U.S. Cl.
CPC ............ *B01D 17/0202* (2013.01); *B01D 61/00* (2013.01); *B01D 61/14* (2013.01);
(Continued)

(58) Field of Classification Search
CPC .. B01D 17/0202; B01D 17/085; B01D 61/00; B01D 61/14; B01D 61/147; B01D 61/18; B01D 61/22; B01D 61/43; B01D 63/00; B01D 63/06; B01D 65/00; B01D 65/02; B01D 65/08; B01D 2321/04; B01D 2321/2033; B01D 2321/2066; B01D 2321/2083; C02F 1/32; C02F 1/36; C02F 1/38; C02F 1/44; C02F 1/441; C02F 1/444; C02F 1/48; C02F 9/00; C02F 2101/32
USPC ............ 210/638, 641, 650, 651, 695, 748.01, 210/748.02, 748.03, 748.05, 764, 768–774, 210/785, 791, 797, 798, 804, 805, 806, 636, 210/652, 748.1, 195.1, 195.2, 257.1, 257.2, 210/258, 259, 321.6, 321.69, 321.87, 411, 210/85, 143, 181, 223; 219/69.14; 451/36, 451/60, 446; 438/691; 204/518, 542

See application file for complete search history.

(56) References Cited

U.S. PATENT DOCUMENTS 3,890,224 A 6/1975 Weiss et al.
4,029,114 A 6/1977 Wiltrout
(Continued)

FOREIGN PATENT DOCUMENTS

DE 3026769 2/1981
DE 4101229 7/1992
(Continued)

*Primary Examiner* — Joseph Drodge
(74) *Attorney, Agent, or Firm* — Bell Nunnally & Martin LLP; Craig J. Cox

(57) ABSTRACT

The present invention discloses a method and apparatus for separating particles and dissolved matter from a produced water fluid stream. Specifically, the present invention includes a first pressure source which transports untreated produced water or contaminated aqueous fluid into a separator annulus with a filter element disposed therein. The untreated fluid is placed under appropriate pressure sufficient to produce turbulent flow, increased particle kinetics and/or cavitation allowing the desired fluid to penetrate and pass into and through the, filter media. The treated fluid is then transported to a collection tank. The contaminant matter retained by the filter media may be removed by the nearly instantaneous reverse pressurization of the separator annulus by a second pressure source thereby removing the contaminant particles away from contact with the filter media, and which may then be transported to a waste collection tank or a separator for further treatment.

19 Claims, 14 Drawing Sheets

Related U.S. Application Data continuation-in-part of application No. 11/042,235, filed on Jan. 25, 2005, now Pat. No. 7,459,091, which is a continuation-in-part of application No. 10/820,538, filed on Apr. 8, 2004, now Pat. No. 7,291,267.

(60) Provisional application No. 60/540,492, filed on Jan. 30, 2004.

(51) Int. Cl.

| | | |
|---|---|---|
| *B01D 63/06* | (2006.01) | |
| *B01D 65/08* | (2006.01) | |
| *C02F 1/44* | (2006.01) | |
| *C02F 9/00* | (2006.01) | |
| *B01D 17/02* | (2006.01) | |
| *B01D 61/00* | (2006.01) | |
| *B01D 61/18* | (2006.01) | |
| *B01D 61/20* | (2006.01) | |
| *B01D 65/00* | (2006.01) | |
| *B01D 65/02* | (2006.01) | |
| *E21B 43/34* | (2006.01) | |
| *F04B 9/113* | (2006.01) | |
| *C02F 1/32* | (2006.01) | |
| *C02F 1/36* | (2006.01) | |
| *C02F 1/38* | (2006.01) | |
| *C02F 1/48* | (2006.01) | |
| *C02F 101/32* | (2006.01) | |

(52) U.S. Cl.
CPC ............ B01D 61/142 (2013.01); *B01D 61/147* (2013.01); *B01D 61/18* (2013.01); *B01D 61/20* (2013.01); *B01D 63/06* (2013.01); *B01D 65/00* (2013.01); *B01D 65/02* (2013.01); *B01D 65/08* (2013.01); *C02F 9/00* (2013.01); *E21B 43/34* (2013.01); *F04B 9/113* (2013.01); B01D 2321/04 (2013.01); B01D 2321/2033 (2013.01); B01D 2321/2066 (2013.01); B01D 2321/2083 (2013.01); C02F 1/32 (2013.01); C02F 1/36 (2013.01); C02F 1/38 (2013.01); C02F 1/441 (2013.01); C02F 1/444 (2013.01); C02F 1/48 (2013.01); C02F 2101/32 (2013.01)
USPC .......... 210/85; 210/143; 210/181; 210/195.1; 210/195.2; 210/223; 210/257.1; 210/257.2; 210/258; 210/259; 210/321.69; 210/411; 210/650

(56) References Cited

U.S. PATENT DOCUMENTS

| | | | |
|---|---|---|---|
| 4,055,500 A | 10/1977 | Parker | |
| 4,136,029 A * | 1/1979 | Cosack et al. | 210/242.1 |
| 4,158,629 A | 6/1979 | Sawyer | |
| 4,222,874 A | 9/1980 | Connelly | |
| 4,352,739 A | 10/1982 | Oliver, Jr. et al. | |
| 4,384,943 A | 5/1983 | Stoner et al. | |
| 4,642,188 A | 2/1987 | DeVisser et al. | |
| 4,646,317 A * | 2/1987 | Evensen | 373/101 |
| 4,927,547 A | 5/1990 | Backman | |
| 4,957,625 A | 9/1990 | Katoh et al. | |
| 5,120,445 A * | 6/1992 | Colman | 210/640 |
| 5,298,161 A | 3/1994 | Sieg | |
| 5,336,863 A * | 8/1994 | Terui | 219/69.14 |
| 5,346,629 A | 9/1994 | Wuller | |
| 5,374,351 A | 12/1994 | Bolton et al. | |
| 5,401,397 A | 3/1995 | Moorehead | |
| 5,434,381 A * | 7/1995 | Mitcheson | 219/69.14 |
| H1568 H | 8/1996 | Huang et al. | |
| 5,846,420 A | 12/1998 | Bolton et al. | |
| 5,906,751 A | 5/1999 | Parker | |
| 5,997,812 A * | 12/1999 | Burnham et al. | 422/24 |
| 6,085,915 A | 7/2000 | Schwandt et al. | |
| 6,110,390 A | 8/2000 | Potter et al. | |
| 6,155,430 A | 12/2000 | Goodman | |
| 6,168,714 B1 * | 1/2001 | Ilias et al. | 210/321.69 |
| 6,203,696 B1 | 3/2001 | Pearson | |
| 6,447,678 B2 | 9/2002 | Chau | |
| 6,562,246 B2 | 5/2003 | McGowan | |
| 6,576,146 B2 | 6/2003 | Fry et al. | |
| 6,607,661 B2 | 8/2003 | Koivula | |
| 6,666,971 B2 | 12/2003 | Chen | |
| 6,669,843 B2 | 12/2003 | Arnaud | |
| 6,712,981 B2 | 3/2004 | Benenson, Jr. et al. | |
| 6,875,358 B2 | 4/2005 | Aarebrot et al. | |
| 7,008,540 B1 | 3/2006 | Weavers et al. | |
| 7,291,267 B2 * | 11/2007 | Johnson et al. | 210/321.69 |
| 7,445,716 B2 | 11/2008 | Quintel et al. | |
| 7,459,091 B2 | 12/2008 | Johnson et al. | |
| 7,731,843 B2 | 6/2010 | Pinchin | |
| 7,906,023 B2 * | 3/2011 | Johnson | 210/636 |
| 8,419,935 B2 * | 4/2013 | Johnson | 210/195.2 |
| 8,557,116 B2 * | 10/2013 | Johnsno | 210/321.69 |
| 8,591,739 B2 * | 11/2013 | Johnson et al. | 210/636 |
| 2003/0146171 A1 | 8/2003 | Herrmann | |
| 2004/0118776 A1 | 6/2004 | Zeiher et al. | |
| 2006/0191834 A1 | 8/2006 | Fuchs et al. | |
| 2007/0110824 A1 | 5/2007 | Nageswaran | |

FOREIGN PATENT DOCUMENTS

| | | |
|---|---|---|
| FR | 2716385 | 8/1995 |
| GB | 2356432 | 5/2001 |
| JP | 62149304 | 7/1987 |
| JP | 8019731 | 1/1996 |
| JP | 2002346347 | 12/2002 |
| WO | WO-99/16715 | 4/1999 |

* cited by examiner

FIG. 8A

| START SAMPLE, TAKEN AFTER BEING CIRCULATED AND STIRRED | | | |
|---|---|---|---|
| NTU | 3 | CONDUCTIVITY | 17.91 MS |
| TDS | 9.02 PPT | SPECIFIC GRAVITY | 1.008 |
| PH | 8.72 | CHLORIDES | 15,180 PPM |
| TEMP | 32 C | | |

FIG. 8B

| FIRST PASS, 100 MICRON, SERIES | | | |
|---|---|---|---|
| PRODUCT | | | |
| NTU | 3 | CONDUCTIVITY | 18.29 MS |
| TDS | 9.15 PPT | SPECIFIC GRAVITY | 1.008 |
| PH | 8.71 | CHLORIDES | 12,375 PPM |
| TEMP | 30 C | | |
| REJECT | | | |
| NTU | 15 | CONDUCTIVITY | 18.17 MS |
| TDS | 9.20 PPT | SPECIFIC GRAVITY | 1 |
| PH | 8.72 | CHLORIDES | 13,200 PPM |
| TEMP | 29 C | | |
| PRESSURES AND READINGS ON EQUIPMENT | | | |
| UNIT PRESSURE | 80 | POD 1 INSIDE PRESSURE | 75 | OUTSIDE POD PRESSURE | 120 |
| PUMP PRESSURE | 100 | POD 2 INSIDE PRESSURE | 60 | OUTSIDE POD PRESSURE | 90 |
| RUN TIME | 1:50 | POD 3 INSIDE PRESSURE | 60 | OUTSIDE POD PRESSURE | 75 |
| VOLUME | 70 GAL | POD 4 INSIDE PRESSURE | 40 | OUTSIDE POD PRESSURE | 50 |

| SECOND PASS, 40 MICRON, SERIES | | | | |
|---|---|---|---|---|
| PRODUCT | | | | |
| | NTU | 3 | CONDUCTIVITY | 16.38 MS |
| | TDS | 8.29 PPT | SPECIFIC GRAVITY | 1.008 |
| | PH | 8.56 | CHLORIDES | 8,413 PPM |
| | TEMP | 29 C | | |
| REJECT | | | | |
| | NTU | 16 | CONDUCTIVITY | 16.50 MS |
| | TDS | 8.23 PPT | SPECIFIC GRAVITY | 1.008 |
| | PH | 8.59 | CHLORIDES | 8,520 PPM |
| | TEMP | 27 C | | |
| PRESSURES AND READINGS ON EQUIPMENT | | | | |
| UNIT PRESSURE | 80 | POD 1 INSIDE PRESSURE | 105 | OUTSIDE POD PRESSURE | 115 |
| PUMP PRESSURE | 100 | POD 2 INSIDE PRESSURE | 90 | OUTSIDE POD PRESSURE | 90 |
| RUN TIME | 2:02 | POD 3 INSIDE PRESSURE | 45 | OUTSIDE POD PRESSURE | 55 |
| VOLUME | 70 GAL | POD 4 INSIDE PRESSURE | 30 | OUTSIDE POD PRESSURE | 40 |

*FIG. 8C*

| THIRD PASS, 10 MICRON, SERIES | | | |
|---|---|---|---|
| PRODUCT | | | |
| NTU | 3 | CONDUCTIVITY | 16.89 MS |
| TDS | 8.41 PPT | SPECIFIC GRAVITY | 1.006 |
| PH | 8.58 | CHLORIDES | 8,520 PPM |
| TEMP | 29 C | | |
| REJECT | | | |
| NTU | 32 | CONDUCTIVITY | 16.83 MS |
| TDS | 8.43 PPT | SPECIFIC GRAVITY | 1.008 |
| PH | 8.58 | CHLORIDES | 8,520 PPM |
| TEMP | 27 C | | |

| PRESSURES AND READINGS ON EQUIPMENT | | | | | |
|---|---|---|---|---|---|
| UNIT PRESSURE | 80 | POD 1 INSIDE PRESSURE | 115 | OUTSIDE POD PRESSURE | 120 |
| PUMP PRESSURE | 100 | POD 2 INSIDE PRESSURE | 90 | OUTSIDE POD PRESSURE | 90 |
| RUN TIME | 1:59 | POD 3 INSIDE PRESSURE | 60 | OUTSIDE POD PRESSURE | 60 |
| VOLUME | 27 C | POD 4 INSIDE PRESSURE | 40 | OUTSIDE POD PRESSURE | 40 |

*FIG. 8D*

| FOURTH PASS, 1.0 MICRON, SERIES | | | |
|---|---|---|---|
| PRODUCT | | | |
| | NTU | 2 | CONDUCTIVITY | 21.2 MS |
| | TDS | 10.6 PPT | SPECIFIC GRAVITY | 1.006 |
| | PH | 8.47 | CHLORIDES | 8,307 PPM |
| | TEMP | 29 C | | |
| REJECT | | | |
| | NTU | 33 | CONDUCTIVITY | 21.2 MS |
| | TDS | 10.7 PPT | SPECIFIC GRAVITY | 1.006 |
| | PH | 8.39 | CHLORIDES | 7,987 PPM |
| | TEMP | 27 C | | |
| PRESSURES AND READINGS ON EQUIPMENT | | | |
| UNIT PRESSURE | 80 | POD 1 INSIDE PRESSURE | 175 | OUTSIDE POD PRESSURE | 140 |
| PUMP PRESSURE | 100 | POD 2 INSIDE PRESSURE | 170 | OUTSIDE POD PRESSURE | 170 |
| RUN TIME | 6:38 | POD 3 INSIDE PRESSURE | 45 | OUTSIDE POD PRESSURE | 170 |
| VOLUME | 70 GAL. | POD 4 INSIDE PRESSURE | GAUGE? | OUTSIDE POD PRESSURE | 50 |

*FIG. 8E*

WASTEWATER TREATMENT METHOD AND APPARATUS

CROSS REFERENCE TO RELATED DATA

The application is a divisional patent application of Ser. No. 12/025,523, filed Feb. 4, 2008 (now U.S. Pat. No. 7,906,023), which is a continuation-in-part of Ser. No. 11/042,235, filed Jan. 25, 2005 (now U.S. Pat. No. 7,459,091); which is a continuation-in-part of Ser. No. 10/820,538 filed Apr. 8, 2004, (now U.S. Pat. No. 7,291,267); which claims the benefit of 60/540,492 filed Jan. 30, 2004.

BACKGROUND OF THE INVENTION

1. Technical Field

The present invention relates to a system for improving the quality of waters and fluids produced from petroleum and gas well drilling and recovery operations, mining operations, and during other industrial activities, and specifically to a method that does not involve the use of traditional filtration or separation methods. The present system separates contaminants from the water and field produced fluids utilizing a pressure separation apparatus which can also create and facilitate hydrodynamic cavitation conditions within the produced fluid. This results in the improved separation and removal of particulates and dissolved constituents from the fluid.

2. Description of Related Art

The safe and effective removal of contaminants from water and other fluids is a consistent problem faced by many industries. The impurities accumulated by water and other fluids during the hydrologic cycle, industrial processes and manufacturing activities may appear in both suspended and dissolved forms. Suspended solids may be generally classified as particles larger than molecular size (i.e. particle sizes greater than $10^{-3}$ mm), which are supported by buoyant and viscous forces existing within water. Dissolved materials (i.e. particle sizes less than $10^{-3}$ mm) consist of molecules and ions, which are held by the molecular structure of water.

The presence of suspended and/or dissolved solids in water, wastewater and other fluids is undesirable for several reasons. The presence of visible suspended solids may be aesthetically displeasing. Likewise, the presence of suspended and/or dissolved solids allows for the adsorption of other chemicals or biological matter into the fluid. Due to the standards promulgated by government agencies, excessive contaminants must be removed from potable water, wastewater and other types of contaminated fluid streams before the effluent may be discharged to the environment or recycled for reuse. If established discharge-contamination levels are exceeded, governmental authorities and agencies may impose surcharges and penalties on the entity responsible for the discharge of fluids which does not meet or exceed the appropriate standard of quality.

Both terrestrial and offshore oil and gas fields produce large quantities of contaminated water that can have significant environmental effects if they are not handled, remediated and discharged properly. In a typical petroleum formation, formation water lies adjacent the formation layer containing the desired hydrocarbons (e.g. oil and natural gas). As a result, when these hydrocarbons are removed from the formation via the wellbore, formation water is brought to the surface along with the hydrocarbons. If required and in order to achieve maximum recovery, water will be injected into the formation to provide additional motive force to recover the hydrocarbons from the formation. As a result, increasing volumes of both formation water and injected water are produced (also referred to collectively as "produced water") in the recovery of oil and gas from the formation. The treatment of produced water is a major component of the cost of producing oil and gas.

From the present day oil and gas operations occurring around the world, the volume of produced water is certainly not insubstantial. For example, 253 million tons of produced water is estimated to have been generated from offshore drilling rigs located in the UK sector of the North Sea in the year 1998. This produced water was then treated according to processes in place at the time and discharged into the ocean. However, the discharged water still contained an average oil concentration of 22 ppm at the time of discharge into, the ocean.

In typical petroleum recovery operations, produced water is separated from the oil or gas recovered from the formation, treated to remove any hydrocarbons or other contaminants mixed or dissolved therein, and then discharged to the surface, ocean, or reinjected into the formation or well depending on the location of the well. Produced water characteristics and physical properties vary considerably depending upon the geographic location of the field, the geological formation with which the produced water has been in contact for thousands for years, and the type of hydrocarbon product being produced. The contaminants of produced water include salt content expressed as salinity, conductivity, or total dissolved solids ("TDS"). Other contaminants may include slurries having dispersed oil droplets, dissolved organic compounds including dissolved oil, drilling fluids, polymers, well treatment and workover chemicals, and other organic and inorganic compounds that can lead to toxicity. Some of these are naturally occurring in the produced water while others are related to chemicals that have been added for drilling and well-control purposes. Further, contaminants can also include dissolved gases including hydrogen sulfide and carbon dioxide, bacteria and other living organisms, and dispersed solid particles. Produced waters also typically exhibit low concentrations of dissolved oxygen and non-volatile dissolved organic materials. Because of the contaminants in produced water, it requires no large amount of thought to surmise that the direct release or reinjection of untreated produced water into the ocean, upon land, or into the subsurface formation would have damaging effects on the environment and pose health risks to animals and humans in both the short and long term.

Due to the presence of the aforementioned undesired constituents/contaminants in produced water, administrative and other governmental agencies have enacted legislation which prohibits the discharge of produced waters containing concentrations of such contaminants that are greater than a prescribed concentration level. For example, the United States Environmental Protection Agency currently limits the content of "oil and grease" in produced waters to 29 ppm (parts per million) with a maximum of 42 ppm. If oil and gas producers discharge produced waters that contain concentrations of specified contaminants which exceed the specified maximum discharge concentrations, severe fines and potential criminal penalties can result. Therefore, the need for a system which can efficiently and economically remove contaminants from produced waters, as dictated by governmental statutes and agencies, is of paramount importance to industry.

One prior art solution for treating produced water involves pumping the water through disposable filters to filter and remove the suspended solids. There are several problems with this prior art solution. First, once the disposable filters have been used they are typically considered hazardous waste and they must be sent to special disposal facilities for disposal after use further depleting the increasingly diminishing landfill space available. Second, the disposable filters are themselves relatively costly and therefore do not provide an economical treatment solution. Third, the constant changing of used disposable filters with clean or new disposable filters is labor intensive. Fourth, the disposable filters have a relatively short lifespan as they (1) are constructed of paper-based material which is easily degraded by contaminants, (2) are unable to continually support the sheer mass of the contaminants that are loaded onto the filters during filtration operations, and (3) cannot withstand typical backwash cleaning pressures. Consequently, a need exists for a way to minimize or eliminate the need for disposable filters in the removal of suspended solids from waste streams such as produced water.

Another problem encountered in removing contaminants from fluids is the expense and difficulty in designing a system that can remove contaminants that vary widely in chemical and physical make-up. As alluded to above, the chemical make-up of contaminants ranges widely from dissolved oil and brine to bacteria in produced waters. Similarly the physical make-up of the contaminants varies in particle size from the ionic range (brine) to the micro and macro particle range (oil droplets). Such a wide range of contaminants presents several challenges in treating produced waters. For example, slurries and biological contaminants can plug filtration equipment, and separation of metals from contaminated water typically requires expensive chemical precipitation processes. These are just a sampling of the difficulties encountered in the treatment of industrial waste water which illustrates the complexity and expense of treatment facilities that must be constructed to treat such waste water in lieu of disposable filters. Because such treatment facilities are complex, they are typically not mobile, therefore requiring industrial waste water be stored on-site and then shipped to a treatment facility. For example, produced water is often stored in a tank near oil or gas well until the waste can be trucked to a treatment or injection facility. Similarly, treated water for recovery operations must be trucked into and stored near the wellhead for petroleum recovery operations such as drilling and fracturing wells. Consequently, a need exists for an improved method and apparatus for treating contaminated water. In one aspect, the apparatus and method should be mobile and able to be economically installed near the location where the contaminated water is produced. In one aspect, the apparatus and method should provide sufficient treatment to meet regulatory standards required to permit discharge of Water directly into the environment. In another aspect, the method and apparatus should be able to provide for the treated water needs of the facility where the apparatus is located. As such, a need exists in the art for a portable, highly efficient filtration apparatus and method which can separate suspended and dissolved solids and other contaminants in a variety of environments. Further, a need exists for an improved apparatus and method of removing particles from fluids in either a liquid or gaseous state. Further, a need exists for an apparatus and method which can consistently remove particles of a desired size so as to efficiently and consistently reduce the chance of the imposition of a surcharge for violating quality control standards and the release of untreated effluents.

SUMMARY OF THE INVENTION

The present invention discloses a method and apparatus for separating particles, dissolved matter and chemical sub-fractions from a produced water fluid stream. In one embodiment, the present invention also discloses a novel separator design which creates or enhances particle kinetics and cavitation physics to increase filtration efficiency and provides for the separation of chemical sub-fractions from fluid streams below one micron in size. In one aspect, the untreated produced water is placed under pressure sufficient enhance standard filtration, create or enhance particle kinetic reactions, or to create or enhance hydrodynamic cavitation ° the separation process wherein suspended and dissolved contaminants are separated from the fluid stream within the separator by one or more of said processes during the separation phase. The treated fluid can then transported to a product collection tank and discharged or sent to additional treatment or polish mechanisms for further treatment. The particulate matter retained by the reusable filter media is removed by the instantaneous reverse pressurization of the separator thereby forcing treated waste away from the reusable filter media and into a reject tank. The waste from the reject tank can then further be treated, optionally, by further dewatering and minimization processes. Any resulting sludge can be further processed as necessary. The dried waste can then be transported to a waste collection center for appropriate disposal or landfilling. The treated effluent may be safely used in a variety of ways including being discharged to the environment for beneficial reuse (e.g. potable water use or agricultural use), utilized for secondary oil/gas recovery operations or injected into disposal wells.

Other aspects, embodiments and features of the invention will become apparent from the following detailed description of the invention when considered in conjunction with the accompanying drawings. The accompanying figures are schematic and are not intended to be drawn to scale. In the figures, each identical or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8A is a table of properties of a field sample of untreated produced water;

FIG. 8B is a table of properties of a field sample of produced water after being treated with a 100 micron flux cartridge according to the present invention;

FIG. 8C is a table of properties of a field sample of produced water after being treated with a 40 micron flux cartridge according to the present invention;

FIG. 8D is a table of properties of a field sample of produced water after being treated with a 10 micron flux cartridge according to the present invention;

FIG. 8E is a table of properties of a field sample of produced water after being treated with a 1.0 micron flux cartridge according to the present invention; and

DETAILED DESCRIPTION OF THE PREFERRED EMBODIMENT

The present invention is directed towards an improved water treatment system for removing contaminants from water. In one embodiment, the use of hydrodynamic cavitation forces and physics in conjunction with traditional separation media to treat contaminated water is both novel and a significant improvement over existing traditional filtration systems. "Untreated water" is used throughout the detailed description and refers to any water containing one or more contaminants, including, but not limited to "produced water," "refinery water," "mining water," and "pulp/paper wastewater." As used herein "produced water" is used interchangeably with "untreated water."

As used herein, "contaminant" refers to any physical, chemical, biological, or radiological substance or matter that has an adverse effect on air, water, or soil and as a consequence of that impact there is a regulation regarding the discharge of that contaminant into the environment.

As used herein, "produced water" means the water or brine brought up from the hydrocarbon bearing formation strata during the extraction of oil and gas, and can include formation water, injection water (including "frac flow back water"), and any chemicals, polymers or drilling fluids added downhole or during the oil/water separation process.

As used herein, "mining water" is defined as water used for the extraction and on-site processing of naturally occurring minerals including coal, ores, petroleum, and natural gas. "Mining water" includes water from tailings. Tailings are low grades of mining ore that are disposed of in mining waste ponds or other fine waste from mining operations suspended in water.

Figure 1:
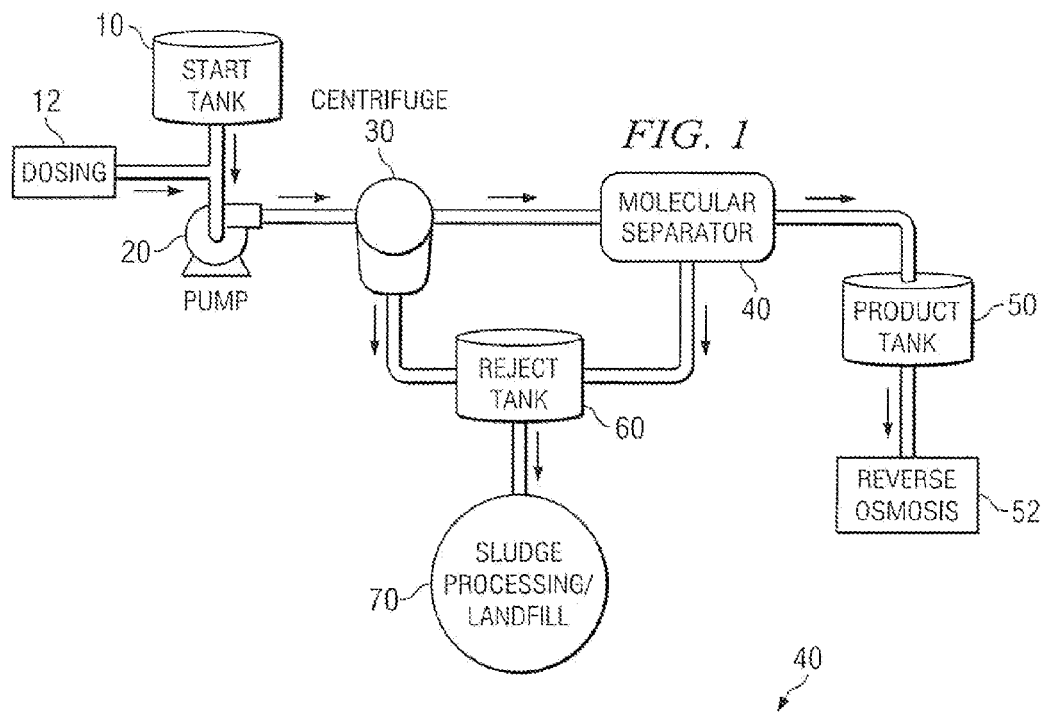
FIG. 1 illustrates a process flow diagram for a water treatment system in accordance with one embodiment of the present invention.

FIG. 1 illustrates a simplified process flow diagram for a water treatment system in accordance with one embodiment of the present invention. As shown in FIG. 1, untreated water is stored in a tank 10. Depending on the solids content of the untreated water, the untreated water can be routed via a pump 20 or other suitable means to a centrifuge 30 to remove heavy constituents, such as sand, dirt, gravel, drilling muds, and other similar material. These heavy constituents can be routed to a reject tank 60 where it can optionally be dewatered or stored for further processing or disposal 70. In one embodiment, the untreated water is routed directly to the molecular separator 40 without being routed to a centrifuge or other similar device.

In one embodiment, additives 12 can be added to the untreated water 10 near the pump inlet as shown in FIG. 1 and/or directly to the start tank 10. In one embodiment, the additives 10 can be added to help control or remove biological organisms or activity in the untreated water stream that can promote fouling of the flux cartridge, as discussed in more detail below. Additives include, but are not limited to sodium hypochlorite, chlorine($Cl_2$), chlorine dioxide ($ClO_2$), bromine ($Br_2$), iodine (I), ozone ($O_3$), bleach, ammonia, metal ions (e.g. $Ag^+$ and $Cu^{2+}$), phenols, alcohols and other chemical disinfectant additives as known in the art. The untreated water from the waste tank can be treated in the molecular separator apparatus 40 to remove contaminants from the untreated water with the use of reusable filter media. The molecular separator apparatus 40 also provides the ability to concentrate contaminants and, routes the contaminants to the reject tank 60 and routes treated water or product to a product storage tank 50. In one embodiment, the treated water from the molecular separator apparatus 40 can be further treated by routing the treated water through a disposable nano-filter (not shown) and/or by routing the treated water through a reverse osmosis system 52. The operation of one embodiment of the molecular separator apparatus 40 is discussed in more detail below.

Figure 2A:
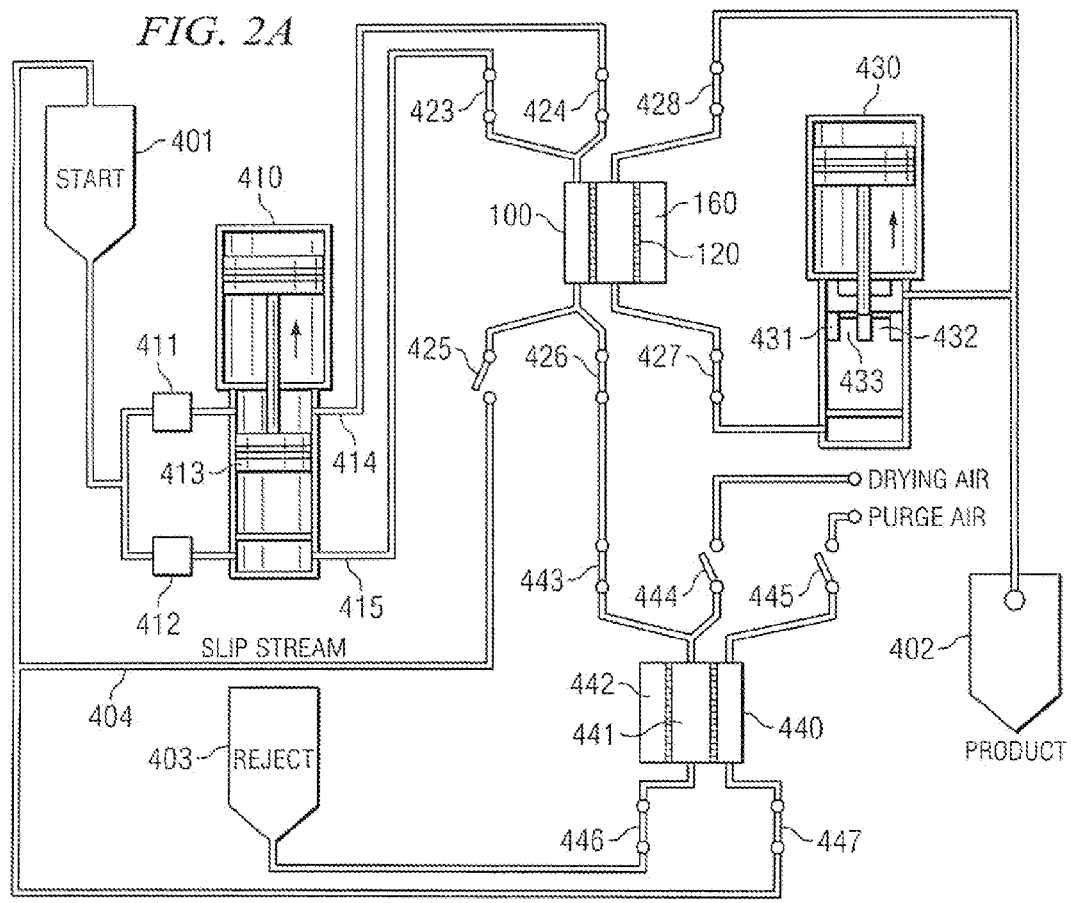
FIG. 2a is a schematic diagram illustrating the interaction of the functional components of the system in which produced water is treated with a single flux cartridge unit in accordance with one embodiment of the present invention.

FIG. 2a is a schematic diagram illustrating the interaction of the functional components of the system in which produced water is treated with a single flux cartridge unit in accordance with one embodiment of the present invention. Produced water can be routed from a centrifuge 30 as shown in FIG. 1 or it can come directly from a storage tank 401, as depicted in FIG. 2a. The produced water may include sulfur compounds, heavy metals, carbonates, brines, salts, drilling fluids, polymers, industrial solvents, or any similar fluid or solid from which sub-fractions are to be separated.

Figure 3:
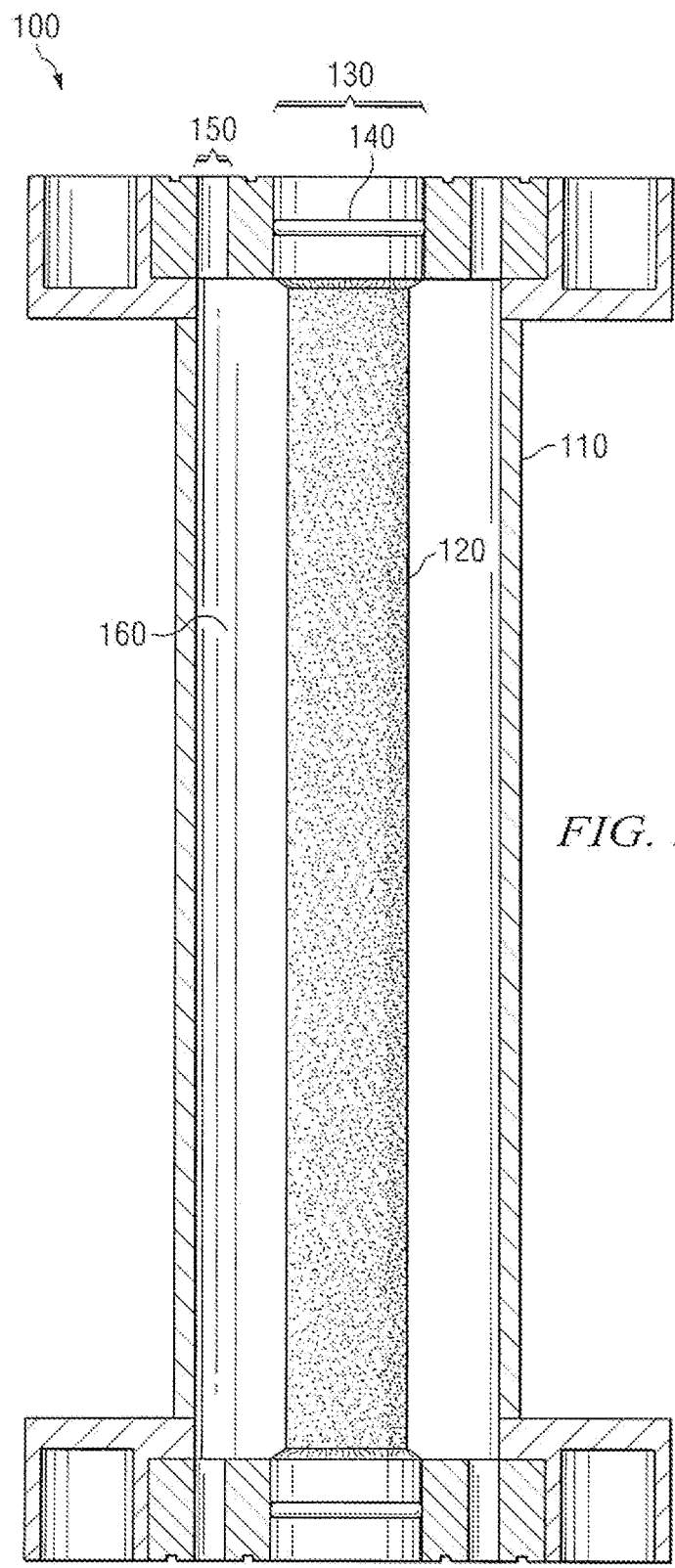
FIG. 3 is a schematic diagram illustrating a cross section of a single flux cartridge unit according to the present invention.

FIG. 3 is a schematic diagram illustrating a cross section of a single flux cartridge seated within the annulus of a separator according to the present invention. A plurality of these flux cartridges seated within corresponding annuli may be assembled in parallel and such arrangement may be referred to as a "Q-pod." With reference to FIG. 3, a flux cartridge unit or separator 100 comprises an outer casing 110 forming an annulus region or fluid ring 160 around a single flux cartridge 120. The outer surface of the flux cartridge 120 is shown. The inside region 130 of the flux cartridge 120 is hollow. A sealing ring 140 on the flux cartridge 120 ensures that no fluid passes between the annulus 160 and the inside region 130 of the flux cartridge 120 when the flux cartridge 120 is sealed in the separator 100.

Figure 4:
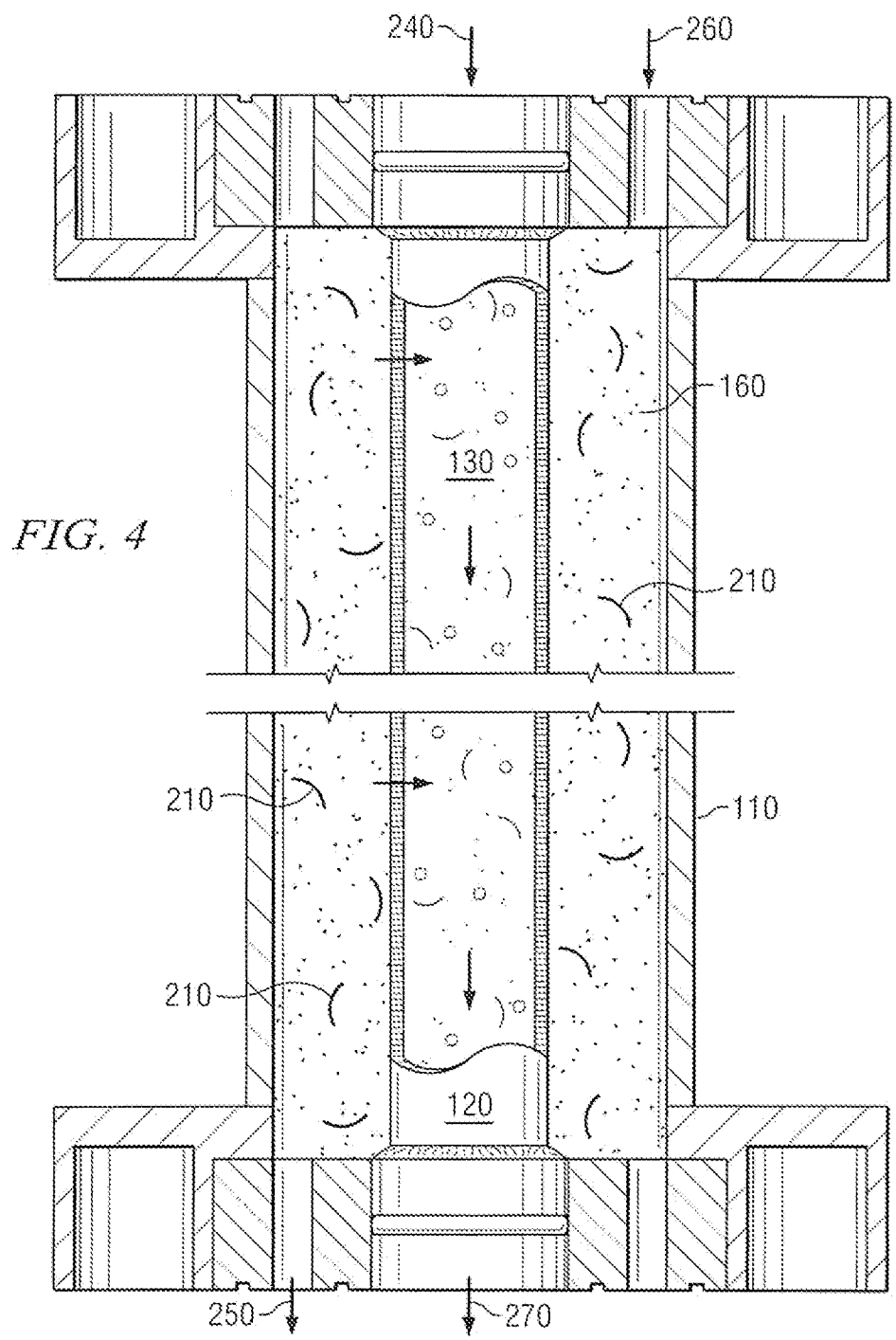
FIG. 4 provides a more detailed cross-sectional view of the flux cartridge membrane of a flux cartridge.

FIG. 4 provides a more detailed cross-sectional view of the flux cartridge membrane of a flux cartridge 120 and the filtration of untreated fluid as disclosed herein. Produced water is directed into the annulus region 160 and through the flux cartridge 120 under pressure. Fluid enters through an entry port or region 260 under pressure. Due to the pressure differential between annulus region and the interior region 130 of flux cartridge 120, a substantial portion of contaminants are retained on the surface and within the interior fissures of flux cartridge 120, while the desired fluid effluent is collected in the interior region 130 of flux cartridge 120 and routed out of the flux cartridge 120 via fluid outlet 270. In addition, the pressures of the system can be manipulated by the user so that the pressure drop experienced by the fluid moving from the smaller diameter inlet 260 into the larger volume of the annulus 160 creates the formation of cavitation bubbles resulting in additional filtration and chemical effects as further discussed herein.

Referring back to FIG. 2a, in one embodiment, the filtration process begins by drawing the produced water from the storage tank 401 by means of a first pneumatic pump 410. The pneumatic pump 410 alternately draws the produced water through two poppet valves 411, 412 via the upward and downward motion of a plunger 413, and alternately pumps the fluid through two outlet lines 414, 415. Although only one flux cartridge unit 100 is depicted, each outlet line 414 and 415 can route fluid to a header in fluid communication with other flux cartridge units 100. Referring back to FIG. 2a, pressurized untreated fluid is delivered to the separator via lines 414 and 415. The poppet valves in the valve assembly which is in fluid communication with the separator via transition plates, controls the movement of untreated fluid into the separator. As the plunger 413 rises (as shown in the present example), fluid is drawn through a poppet valve 412. Simultaneously fluid is pumped out through the upper outlet line 414. When the plunger 413 reverses direction and pushes downward, the lower poppet valve 412 closes and the produced water is drawn through the upper poppet valve 411 and pumped out through the lower outlet line 415.

The produced water moves through the Outlet lines 414, 415 to a separator 100 and specifically into the annulus or fluid ring 160. For the purposes of FIG. 2a, a single separator 100 with flux cartridge 120 inserted therein is shown for ease of illustration. In one embodiment, the separator contains eight annuli with eight corresponding flux cartridges seated therein and may be referred to as a Q-Pod. Alternative configurations with additional or fewer annuli and flux cartridges are possible.

Figure 2B:
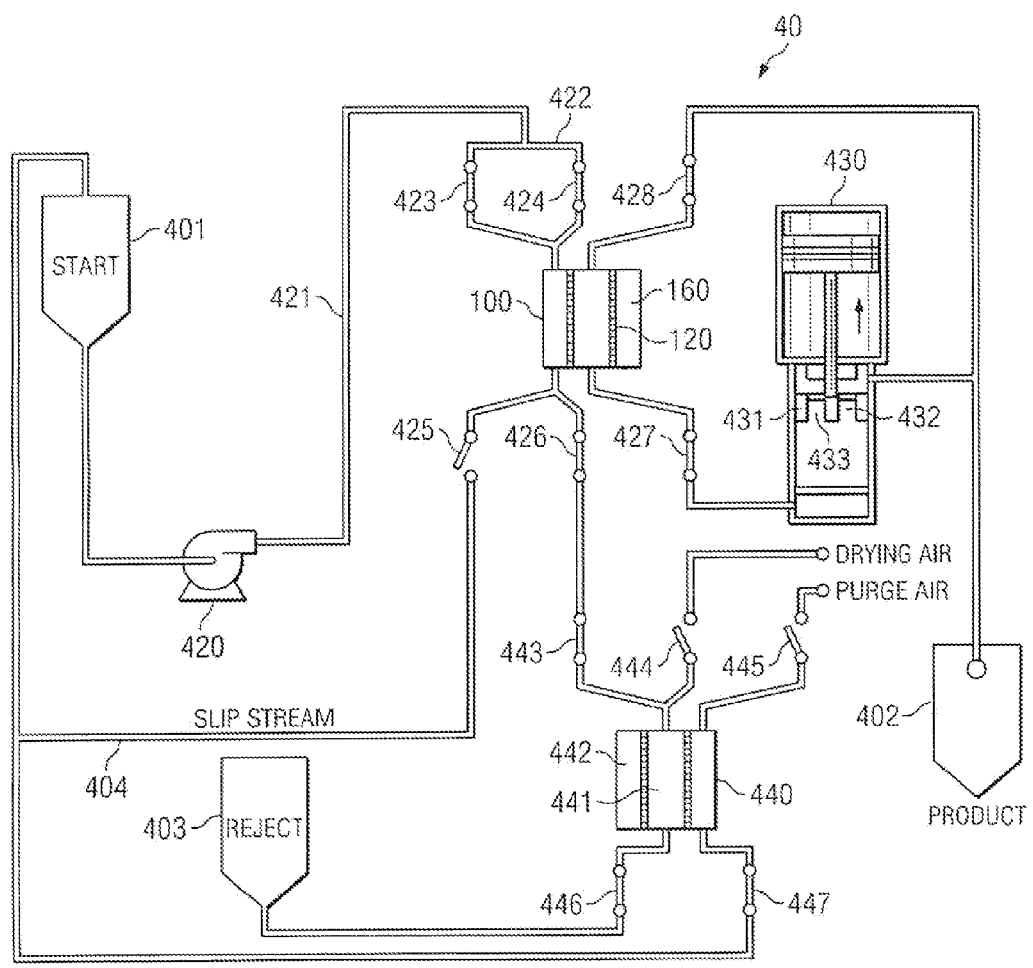
FIG. 2b is a schematic diagram illustrating the interaction of the functional components of the system in which produced water is treated with a single flux cartridge unit in accordance with an alternative embodiment of the present invention.

FIG. 2b is a schematic diagram illustrating the interaction of the functional components of the system in which produced water is treated with a single flux cartridge unit 100 in accordance with an alternative embodiment of the present invention: Referring to FIG. 2b, a centrifugal pump 410 or other suitable pump is used to pump fluid from a storage tank 401 through an outlet line 421 and into a header 422 in fluid communication with the separator 100. Although only one flux cartridge unit 100 is depicted, the outlet line 421 can route fluid to a header 422 in fluid communication with other flux cartridge units 100.

With reference to FIGS. 2a and 2b, seated within the separator 100 is a flux cartridge. 120. A flux cartridge 120 comprises a membrane that assists in the separation of contaminants from the produced water. A space (referred to herein as a fluid ring 160) exists between the inside surface of the separator 100 and the outer surface of the flux cartridge 120. As produced water is delivered to the separator with the first pump outlet line 414, it passes through a poppet valve 424 and into the fluid ring 160. When the produced water is delivered with the second or lower pump outlet line 415, a corresponding poppet valve 424 closes and the fluid passes through a second poppet valve 423 and into the fluid ring 160.

Referring to FIGS. 2a, 2b, and 4, once in the fluid ring 160, the produced water moves in a turbulent manner whereby contaminants are removed via pressure filtration, particle kinetics and hydrodynamic cavitation as discussed in greater detail herein. Fluid passes into and through the flux cartridge membrane and into the interior chamber 130 of the flux cartridge 120. Contaminant particles and larger molecules 210 are left behind as residue in the fluid ring 160, and on the exterior and within the fissures of the flux cartridge 120. The pressure supplied by the first pump 410 pushes the treated product out of the center of the flux cartridge 120 through a flux cartridge exit valve 427 and into a second pump, called a pneumatic ejector pump 430. Alternatively, the treated fluid product may leave the flux cartridge 120 through an ejector bypass valve 428 and travel directly to a product collection tank 402. This ejector bypass is used when a single ejector pump 430 services multiple separator filter pods in alternative embodiments of the present invention.

During the filtration cycle described above, the ejector pump plunger 431 is drawn up (as shown in FIGS. 2a and 2b) into a charged "ready" state. Next, check valves 432, 433 that are built into the plunger's disc, are opened. In this position, the check valves 432, 433 allow the treated product coming from the flux cartridge 120 to pass by the plunger 431 and out of the ejector pump 430 and into the product collection tank 402. This filtration cycle repeats for each annulus/flux cartridge within the separator pod for a pre-determined time period (e.g., 20-25 seconds) or until separation efficiency declines below a pre-determined level. At the end of this separation cycle period, the each annulus/flux cartridge within the separator is backwashed and cleaned with a reverse flush (ejection cycle). The annuli/flux cartridges can be backwashed all at once, or programmed to backwash at individually at the desired interval, thereby allowing the system to maintain continual filtration, while backwashing at the same time. Alternatively, a sensor assembly may be employed to measure the pressure drop across the flux cartridge or other appropriate location. When the pressure differential becomes excessive, or reaches a certain value, the sensor assembly sends a corresponding signal to the central controller which initiates reverse flush operations (ejection cycle). Such sensor assemblies are known in the art and further description thereof is considered unnecessary.

Referring to FIG. 2a, the reverse flush operation or ejection cycle begins by stopping the first pump 410 and shutting the poppet valves 423, 424 at the top of the separator 100 of the separator filter pod. In the embodiment using the centrifugal pump 420 depicted in FIG. 2b, the pump 420 is not shut off as it is still serving other separators (not shown) when one of the separators is in the backwash cycle. Next, the pneumatic ejector 430 is activated and its plunger 431 is driven downward. This motion closes the plunger's check valves 432, 433 and stops the flow of treated fluid past the plunger 431, allowing the plunger to exert pressure on the fluid inside the ejector. The fluid is pushed back through the flux cartridge exit valve 427, through the flux cartridge 120 and into the fluid ring 160. The time period for this reverse ejection flush or ejection cycle is approximately 0.35 seconds and is carried out under higher pressure than the normal filtration cycle driven by pump 410. For example, the pressure exerted on the produced water by the first pump 410 may be up to 150 psi (1.03 MPa) depending on the viscosity of the fluid involved. In contrast, the pressure exerted by the ejector 430 during the reverse flush may be up to 300 psi (2.06 MPa). This quick, high-pressure reverse burst removes contaminant particles and residue remaining within the fissures and outside surface of the flux cartridge 120 and re-homogenizes the particles and residue in the fluid ring 160.

In the next phase of a typical cycle, a poppet valve 426 on the bottom of the separator 100 is then opened to allow the pressurized contaminant particles and residue solution to flush out of the fluid ring 160 and into a concentrator annulus 442 or directly to a reject collection tank 403. The concentrator annulus 442, as its name suggests, concentrates the material flushed from the separator 100 by removing a significant portion of the flush fluid used during the ejection cycle. Unlike the separator filter pod, which may contain up to eight annuli in the preferred embodiment, the concentrator 440 contains only one annulus with a flux cartridge 441 seated therein in a preferred embodiment. The flushed contaminant waste enters the concentrator annulus 442 through an open poppet valve 443 and into the interior chamber of the concentrator's flux cartridge 441. The desired effluent fluid passes through the membrane of the flux cartridge 441 and into the fluid ring 442, leaving the concentrated contaminant waste residue in the interior chamber of the flux cartridge 441. A fluid return poppet valve 447 in connection with the bottom or one end of the separator annulus 442 allows the treated fluid in the fluid ring 442 to return to the starting tank 401. Next, the poppet valve 443 through which the waste fluid entered the separator 440 is closed and a drying air poppet valve 444 is opened to let drying air into the interior chamber of the separator flux cartridge 441. This drying air provides a mechanism to dewater the concentrated waste and drives additional flush fluid through the flux cartridge 441 membrane and through the return poppet valve 447.

The drying air poppet valve 444 and fluid return poppet valve 447 are then closed, and a purge air poppet valve 445 is opened to allow in pressurized purging air into separator 440. When the air pressure inside the separator 440 reaches a pre-determined or desired level (e.g. 110 psi), poppet valve 446 is opened which allows the waste residue inside the flux cartridge 441 to escape into a waste collection tank 403. In alternative embodiments, a settling tank may be used in place of the separator 440 to permit produced water to be recycled back into the tank 401 or to produce a final product.

Figure 5A:
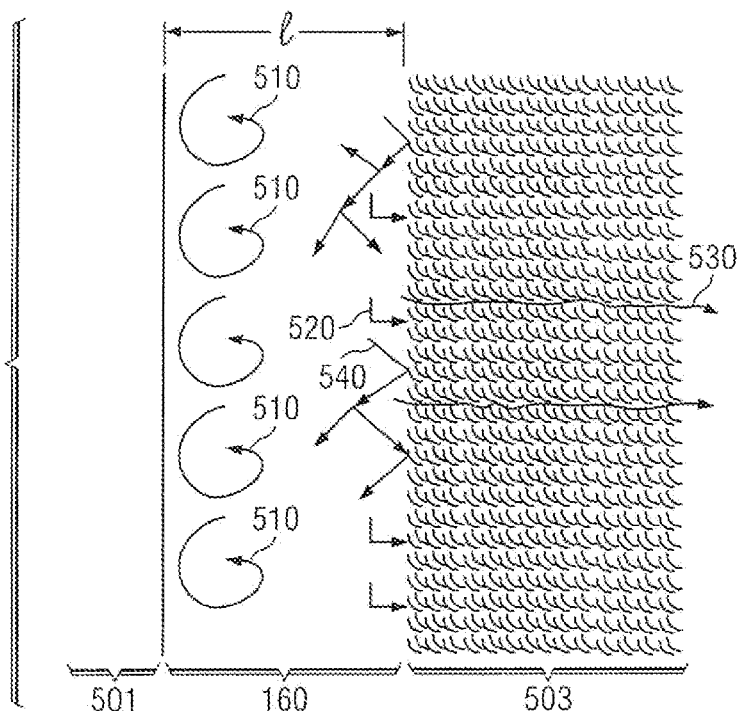
FIG. 5a is a cross-section view of the filter membrane of the flux cartridge inside the annulus of a separator.

Referring now to FIG. 5a, a portion 503 of a single flux cartridge 120 as shown in FIGS. 2-4 illustrates filtration in more detail according to one embodiment of the present invention. The flux cartridge comprises the membrane that filters the contaminants from the produced water 501, 160. In one embodiment, the porous matrix of the filter membrane 503 is created by pressing or sintering metal powder, metal fibers, woven metal mesh, or any combination of these materials, at high pressure and then annealing it using well-known metallurgical techniques known in the metallurgical art.

This type of filter membrane provides filtration at both its surface and in its depth. Specifically, although the pores at the surface of the filter membrane 503 may be larger than the filter specification, the flow path through the filter is tortuous and contaminant particles are intercepted by the metal media. Sintered metal media typically exhibit a high porosity, and therefore high flow rate and low pressure drop, with excellent contaminant particle retention. In one embodiment, the present invention uses a lower membrane thickness than those typically found in the prior art (e.g. 0.125 inches (3.2 mm) instead of a prior art membrane thickness of about 0.40 inches (10 mm)). A thinner filter membrane 503 produces a much higher flow rate of fluid through the filter membrane. Lower thicknesses are possible, in part, because of controlled fluid turbulence which is present in the fluid ring 160 during operation Of the invention disclosed herein. In the disclosed embodiment, the preferred fluid ring length (l) is 0.125 inches (3.2 mm) when used in conjunction with a flux cartridge diameter of 0.375 inches (9.5 mm). These dimensions have been found to optimize the volume of reverse flush fluid required to clean the separator annuli and to minimize the amount of reverse flush fluid required to clean the separator annuli. To obtain effective filtration and reverse flush efficiencies utilizing the apparatus embodiment described herein, the desired ratio of fluid ring length (l) to the diameter of flux cartridge utilized is typically 1 to 3, when using a 0.375 inch (9.5 mm) diameter flux cartridge.

The turbulent flow of the produced water in the fluid ring 160 is represented by a curved arrow 510. This turbulent flow is created and controlled by the pressure differential and the rhythmic pumping action of the pneumatic pump (pump 410 in FIG. 2a) and actuation of the poppet valves within the valve head assemblies of the separator. As the outlet stream poppet valves (i.e. 423, 424 in FIG. 2a) of the first pneumatic pump open and close with the pumping action, a temporary drop in pressure in the fluid ring 160 is caused when the poppet valves switch position (open or closed), creating a sudden velocity differential and corresponding pressure drop in the fluid ring. This effect is magnified by the suction and pulsing action after each infusion of fluid as the poppet valves open and close. As a result, fluid pulses up and down within the fluid ring 160 resulting in the turbulence represented by the arrows 510 in FIG. 5a. This turbulence is again magnified by the high velocity of the fluid moving through the relatively small volumetric space in the fluid ring.

Laminar flow consists of fluid flowing in straight lines at a constant velocity. If the fluid hits a smooth surface, a circle of laminar flow results until the flow slows and becomes turbulent. At faster velocities, the inertia of the fluid overcomes fluid frictional forces and turbulent flow results producing eddies and whorls (vortices). The present invention uses turbulent fluid flow for improved molecular and particle kinetics such that only the desired, smaller molecules 530 (e.g. water) pass through the membrane matrix 503. In one embodiment, to pass through the fissures of the flux cartridge membrane 503, a molecule in the fluid ring 160 has to enter interstices or fissures at almost a 90 degree angle or perpendicularly to the surface of the membrane 503 when the molecule enters the membrane (as represented by the arrow at a right angle 520). Due to the constant fluid turbulence, only the lighter molecules are able to make this turn quickly enough to pass through the membrane 503 and enter the interior chamber of the flux cartridge. Heavy molecular contaminants (e.g., suspended solids, iron complexes, oil and grease) cannot turn fast enough to reach the appropriate entry vector or angle when they contact the membrane 503. As shown in FIG. 5a, when heavier molecules hit the uneven surface of the membrane surface, rather than pass through, they careen off and strike similarly sized molecules, causing them in turn to scatter and thereby increase the kinetic energy present in the fluid ring between the annulus and flux cartridge. This kinetic pattern is illustrated by arrow 540. In the absence of fluid turbulence or when laminar fluid flow conditions exist, the heavier molecules in the fluid would lose a majority of their kinetic energy and would not be able to enter the membrane. Thus, fluid turbulence is necessary to keep the heavier molecules bouncing off the surface of membrane 503. As fluid turbulence increases, the smaller a molecule has to be in order to be properly oriented to pass through the membrane 503. Therefore, the filtration of smaller molecules can be accomplished by using a flux cartridge with a less porous membrane matrix, by increasing the fluid turbulence within the separator fluid ring 160, or by a combination of the two. Consequently, the present application can provide an effective means of separating total suspended solids (TSS) from untreated fluids with the use of a reusable filter.

The present invention also provides a novel method of achieving the filtration by membrane emulation, since the filtering effects of a smaller membrane matrix can be achieved without actually changing the porosity of the flux cartridge interstices. Referring back to FIG. 2a, a slipstream poppet valve 425 controls the flow of fluid from the separator fluid ring 160 to a slipstream fluid hose or path 404 that feeds back to the start tank 401. During membrane emulation, this slipstream poppet valve 425 is opened while the first pneumatic pump 410 is pumping pressurized produced water into the separator fluid ring 160, which allows the produced water to move through the fluid ring 160 at a faster velocity due to the increased pressure differential. When the poppet valve 425 is opened, flow in the fluid ring 160 is substantially vertical. Because the friction forces imparted by the inner and outer circumference of the fluid ring 160, the velocity profile is parabolic meaning that fluid travels faster as distance from the either the inner or outer circumference increases. Consequently, particles will agglomerate on the surface of the flux cartridge 120 thereby decreasing the effective pore size of the flux cartridge. In effect, this reduces the size of particles which are able to pass through the reduced pore space of the flux cartridge 120. As a result, the ability to create this condition on the flux cartridge allows the operator to "emulate" a filter porosity with is smaller than the physically measured porosity of the flux cartridge 120. With this membrane emulation technique, the present invention is able to turn, for example, a five micron flux cartridge into the functional equivalent of a one micron flux cartridge by manipulating the pressure and flow conditions existing in the separator fluid ring 160 due to the large pressure differential created by the slipstream path 404.

The present invention also provides a way to remove, dissolved materials such as brine from untreated water. For example, returning to FIG. 5a, another effect produced by the filter matrix 503 is cavitation of the treated fluid as it passes through the membrane 503. Cavitation is defined as the formation, expansion, and implosion of microscopic gas bubbles in liquid. Cavitation is produced when the static pressure in a fluid falls below its temperature-related vapor pressure. A forceful condensation or implosion of the bubbles occurs when the fluid reaches a region of higher pressure.

Without being bound by theory, it is believed that the turbulent forces caused by the filtration and ejection cycle of the present invention creates pulsating energy waves that causes hydrodynamic cavitation and results in both physical and chemical changes to contaminants such as dissolved solids, hydrocarbons and more complex chemical structures. It is also believed that cavitation bubbles having localized areas of very localized, extremely high temperatures (perhaps greater than 5000 K) ("hot spots") and pressures (perhaps greater than 1000 atm) are created within the bubbles during the collapse of microscopic vacuoles or bubbles thereby causing several physical and chemical phenomena including, but not limited to, flocculation and oxidation reactions. Under these extreme conditions, it is believed that organic compounds are decomposed due to the collapse of these bubbles described below. Other compounds or species present in the surrounding condensed layer also undergo reactions comparable to those found in high temperature combustion. It is also believed that cavitation reactions may result in the creation of free radicals which in turn promote oxidation reactions that decompose organic species in the produced water. For example, cavitation of water can cause dissociation of water into hydrogen and hydroxide. The free hydroxyl radical OH is a powerful oxidizing agent and can facilitate removal of dissolved organic material from the treated fluid. Oxidation caused by hydrodynamically inducing cavitation is known to be orders of magnitude stronger than oxidation caused by the ultrasonic induction of acoustic cavitation (discussed below).

It is also believed under such hot-spot model that the maximum temperature realized in a collapsing bubble decreases as the thermal conductivity of the dissolved or entrapped gases increase. Because higher hot spot temperatures are believed to be more advantageous for the degradation of some contaminants, in one embodiment, the thermal conductivity of the dissolved gases in the fluid ring 160 is physically or chemically lowered. For example, to physically lower the thermal conductivity, in one embodiment, air or other gas is cooled prior to being supplied to the fluid ring 160. In one embodiment, the separator 100 unit is cooled by any suitable method known in the art.

There are generally three regions where chemical and physical phenomena occur in cavitation: (1) the gas phase within the cavitation bubble where elevated temperature and high pressure are produced, (2) the interfacial zone between the bubble and the produced water or solution where the temperature is lower than inside the bubble but still high enough for certain reactions to occur, and (3) the fluid of the produced water at ambient temperature wherein reactions and diffusion are taking place.

Figure 5B:
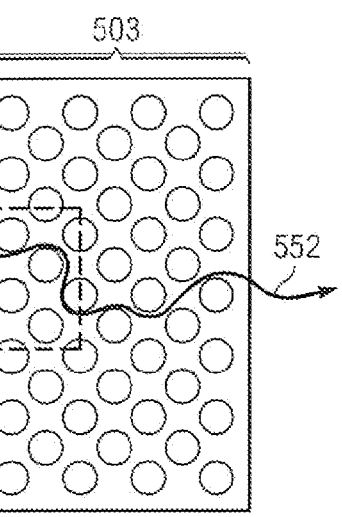
FIGS. 5b-5c provide a more detailed prophetic view of the tortuous path the fluid travels as it is forced through the separation media.
Figure 5C:
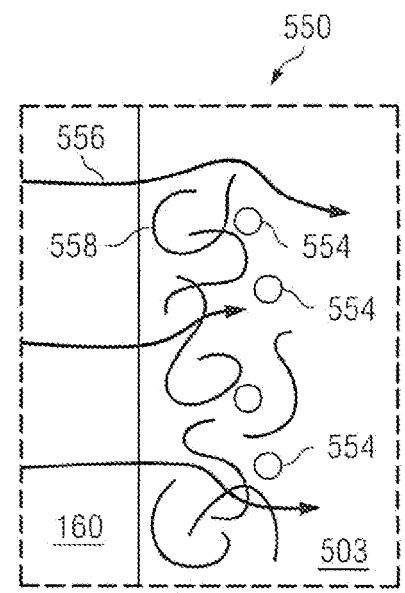

FIGS. 5b-5c provide a more detailed prophetic view of the tortuous path the fluid travels as it is forced through the separation media, in accordance with one embodiment of the present invention. As discussed above, cavitation is defined as the formation, expansion, and implosion of microscopic gas bubbles 554 in liquid. The shockwaves produced by the cavitation may accelerate particles 556 to high velocities and increase inter-particle collisions. Additionally, localized spots of high temperature and high pressure may be produced during the final phase of implosion. The presence of these localized high temperature and high pressure gradients in addition to the kinetic energy formed by the shockwaves may encourage the decomposition of larger molecules by both mechanical and thermal means. For example, the mechanical energy imparted on large molecules, such as oil, grease or polymers in the filter media may be analogous to pushing, extruding, or forcing a large circular molecule through a smaller pipe and may force the intra-molecular bonds to be overcome. The cavitation may occur in the inner fissures or interstices of the flux membrane and/or the interior of the flux cartridge in the vicinity of the flux cartridge membrane during the filtration cycle or in the vicinity of the fluid ring during the ejection cycle.

Referring back to FIG. 5a, as the treated fluid passes through the interstices of membrane 503 cavitation results and gas bubbles are produced. When these gas bubbles reach the inner fissures of the flux cartridge and membrane 503 (e.g. arrow 530) they begin to rapidly implode. During this implosion process, similar and dissimilar molecules flocculate and form precipitates. Molecular bonds are broken and free radicals are created further enhancing the filtration process. Another effect produced by the separation media is the breakup of emulsions in the treated fluid. As the filter fluid is pushed through the separation media or flux cartridge membrane 503 under pressure, and as cavitation reactions occur, emulsions in the fluid are broken. By using different size filter matrices and fluid velocities, the present invention is capable of separating particles 300 microns in size and smaller. The different filter sizes provide a variety of conditions that cause desired amounts and rates of cavitation.

With reference to FIG. 5a, sediment in the produced water can buildup along the outer perimeter of the flux cartridge 120 in the fluid ring 160. Such build-up is especially likely to occur at the first filter pod or when there is a step change to a filter pod having a flux cartridge membrane with a smaller micron filter matrix. As a result, the first filter pod to process produced water or the first filter pod where there is a step change in the micron size of the filter matrix, may function more as a traditional pressure filter by mostly removing total suspended solids than a cavitation device. Such build-up material can be backflushed by a pressure exerted, for example, by a first pneumatic ejector 430 (shown in FIG. 2a) through the flux cartridge 120 and into the fluid ring 160.

The separation apparatus and method disclosed herein can be enhanced with the addition of various other separation methods to the separator as discussed in detail below.

Biocide

In one embodiment, the filter membrane 503 comprises a ceramic flux cartridge. Ceramic flux cartridges are known in the art and are available from vendors such as Doulton USA of Southfield, Mich., USA. In one embodiment, filter membrane 503 acts as a biocide to destroy biological material in the untreated water. In one embodiment, the flux cartridge is impregnated with a biocide. In one embodiment, the filter membrane 503 further comprises a colloidal silver-impregnated ceramic filter. Such impregnated filters are known in the art as illustrated by U.S. Published Patent Application No. 2007/0110824, which is hereby incorporated by reference. Other methods of manufacturing filter membranes 503 will be apparent to those of skill in the art.

Electrochemical Cell

Figure 5D:
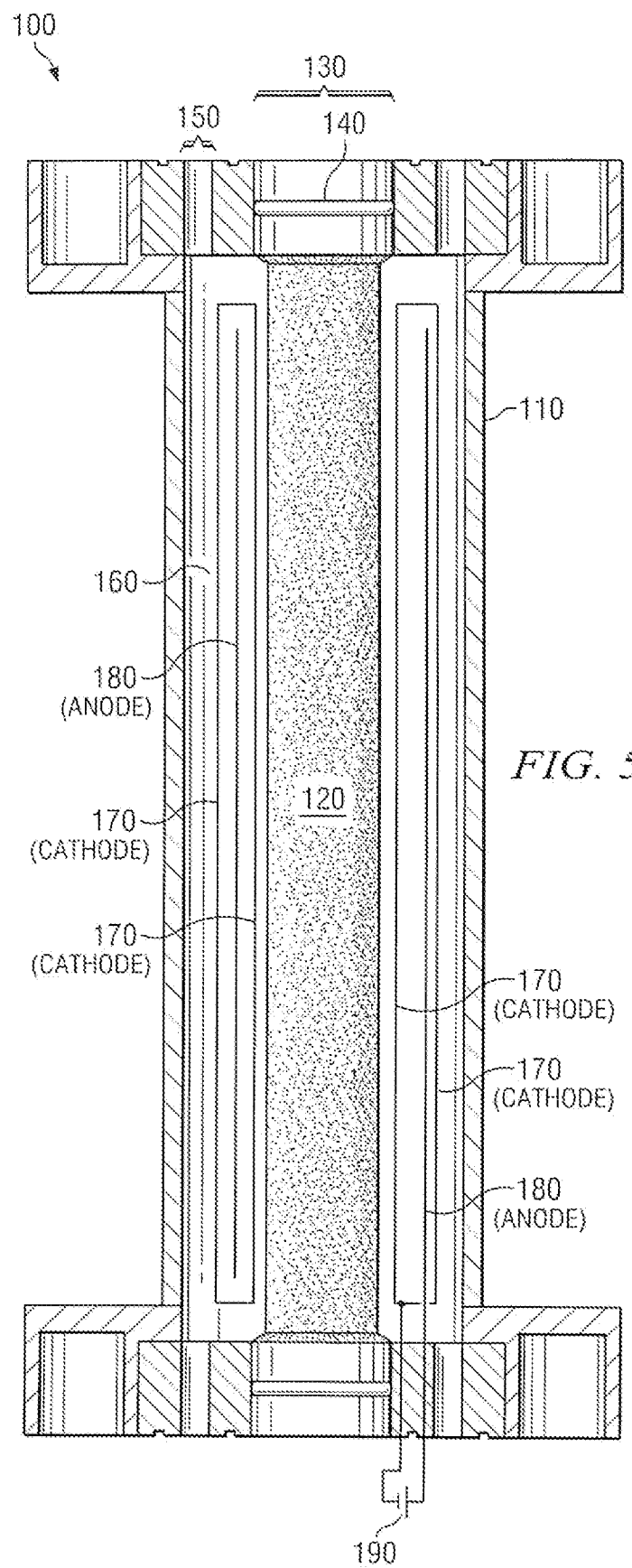
FIG. 5d is a schematic diagram illustrating a cross section of a single flux cartridge unit comprising an electrochemical cell according to one embodiment of the present invention.

FIG. 5d is a schematic diagram illustrating a cross section of a single flux cartridge unit comprising an electrochemical cell according to one embodiment of the present invention. In one embodiment, the flux cartridge 100 comprises two or more electrodes and an electrical current source. As shown in FIG. 5d, in one embodiment, the flux cartridge 100 comprises two cathodes 170, one anode 180 between the two cathodes, and an electrical current source 190. Such cells are known in the art as exemplified by WO 99/16715 and U.S. Pat. No. 4,384,943, both of which are hereby incorporated by reference in their entirety. In one embodiment, the electrodes 170,180 are circumferential plates and can be perforated to facilitate the flow of fluid within the fluid ring 160. As shown in FIG. 5d, a cathode 170 is on each longitudinal side of the anode 180. However, such embodiment is provided for purposes of illustration and not limitation and any suitable arrangement can be used. In an embodiment not shown, the casing 110 itself can be an electrode. In one embodiment, the anode 180 can be made of titanium coated with a catalytic coating or can be made of another suitable metal. In one embodiment, the cathode 170 can be made of steel. In one embodiment, the electrochemical cell is used to precipitate out metals and dissolved constituents in the fluid in the fluid ring during the separation cycle which are then removed via the backwash ejection cycle described herein. Likewise, if sufficient current is used, the electrochemical cell is used to destroy biological material within the fluid ring 160.

Electromagnetic Field

Figure 5E:
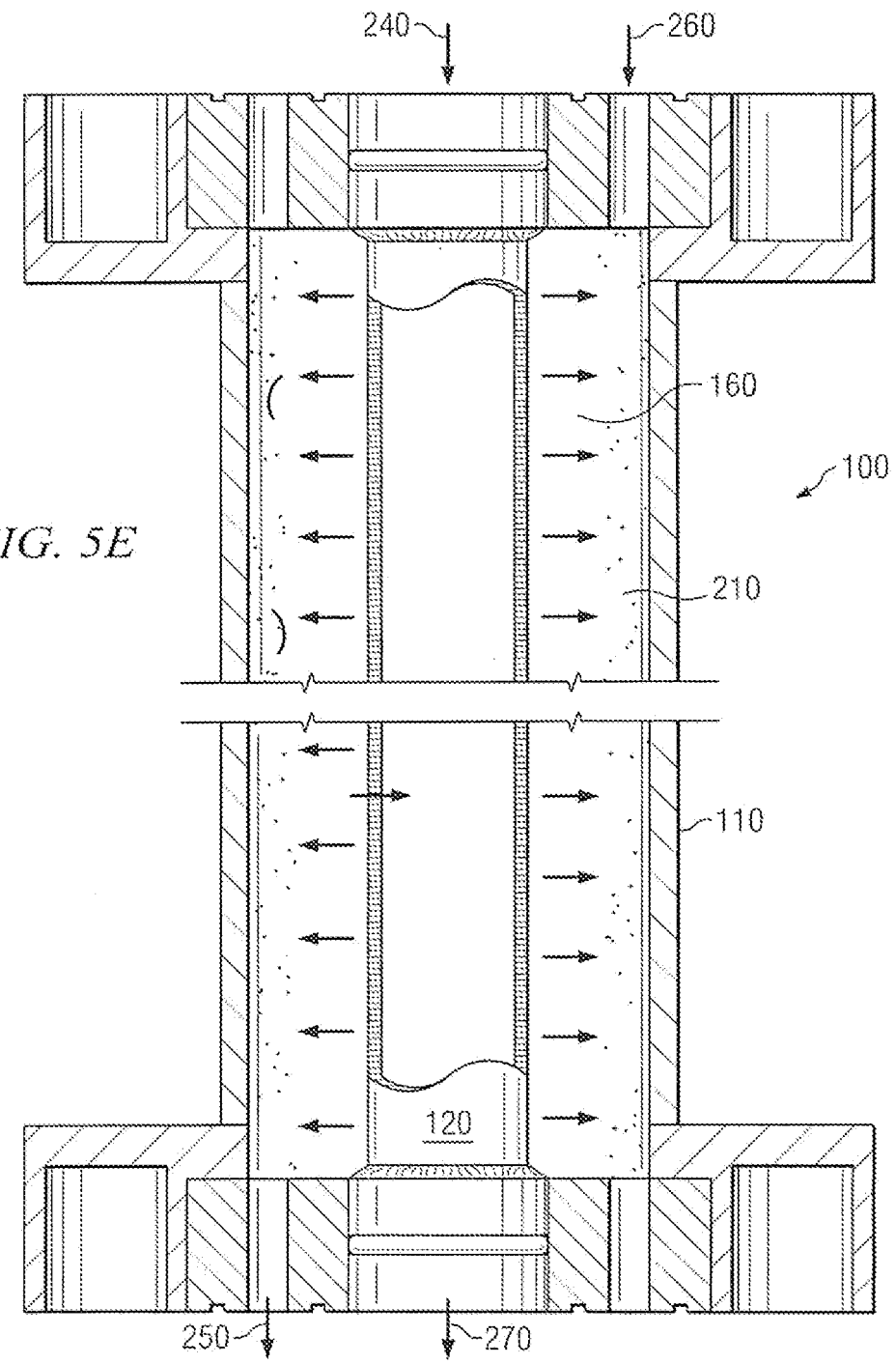
FIG. 5e provides a more detailed cross-sectional view of the flux cartridge subjected to a magnetic field in accordance with one embodiment of the present invention.

FIG. 5e provides a more detailed cross-sectional view of the flux cartridge subjected to a magnetic field in accordance with one embodiment of the present invention. In one embodiment, the untreated fluid is subjected to a magnetic force, magnetic field or magnetic gradient upon entry into the fluid ring of a separator to collect or agglomerate solid particles affected by Such magnetic field. Such filtration methods are known in the art as disclosed in U.S. Patent Publication No. 20060191834, which is hereby incorporated by reference in its entirety. The magnetic force can significantly affect particle movement during the filtration process, in some cases contributing to the formation of a filter cake on the surface of the flux cartridge (not shown) and/or on the inner surface of the outer casing 110, as depicted in FIG. 5e. When the particles agglomerate into larger molecules 210, there is an increase in their effective diameter in turn increasing the filtration efficiency of the flux cartridge unit. The magnetic field can be applied at any angle to the direction of pressure driving the untreated fluid through the flux cartridge, whatever proves most effective for the fluid undergoing filtration. The field can be applied parallel, perpendicular, or at any angle in relation to the direction of fluid flow. The means for subjecting a magnetic field or gradient to the untreated fluid may include a solenoid attached to or contained within the filter pod or flux cartridge or a permanent magnet internal or external to the filter pod and/or flux cartridge. Typical ranges of homogenous magnetic field strengths which would be useful in this application are greater than 0.01 T.

In one embodiment, the flux cartridge 100 is subjected to a magnetic field such that when fluids having magnetic materials such as iron filings, enter the annulus, the magnetic field can be activated so that the magnetic materials are moved outwardly in the direction shown by the arrows. Consequently, the magnetic materials are attracted toward and retained on the outer casing 110 in the fluid ring 160. Then, just prior to or immediately after the backwash operation is initiated, the field can be released and the retained magnetic materials are flushed out of the annulus during the backwash ejection cycle.

Acoustic Cavitation Via Ultrasound

In one embodiment, the hydrodynamic cavitation caused by the manipulation of pressures within the separator and filter medium is coupled with acoustic cavitation to further enhance the overall cavitation reaction that occurs in the molecular separator. In one embodiment, an ultrasonic wave source is coupled to the flux cartridge 100 to create acoustic cavitation. As used herein, "acoustic cavitation" is defined ultrasonically-induced cavitation. Stated differently, "acoustic cavitation" is the formation, growth, and collapse of bubbles occurring as from an ultrasound source. Ultrasonically-induced cavitation can be provided by an ultrasound probe inserted into the fluid ring of the flux cartridge 120. In one embodiment, the filter membrane 503 comprises one or more ultrasonic probes to facilitate acoustic cavitation.

There are two types of acoustic cavitation—stable and transient. Transient cavitation occurs at greater acoustic pressures, where bubbles violently implode after a few cycles. This implosion can have a number of effects, including transiently raising the local temperature by hundreds of degrees Celsius and the local pressure by hundreds of atmospheres, emitting light by a poorly-understood phenomenon called sonoluminescence, creating short-lived free radicals, which in turn promote oxidation reactions that decompose organic species in the produced water. Acoustic cavitation can effect a number of acoustic chemical and biological changes in a liquid. Consequently, in one embodiment, transient acoustic cavitation is used to destroy the biological material in untreated water. Transient acoustic cavitation can occur at frequencies between about 20 and about 350 kHz.

Stable acoustic cavitation can occur at low-pressure portions of an ultrasound wave and can occur at frequencies between about 700 and 1000 kHz. Because stable acoustic cavitation bubbles have less time to grow, they are smaller and therefore result in a less vigorous implosions and collapse than occurs in transient acoustic cavitation.

Example of Produced Water Treatment Array

Figure 6A:
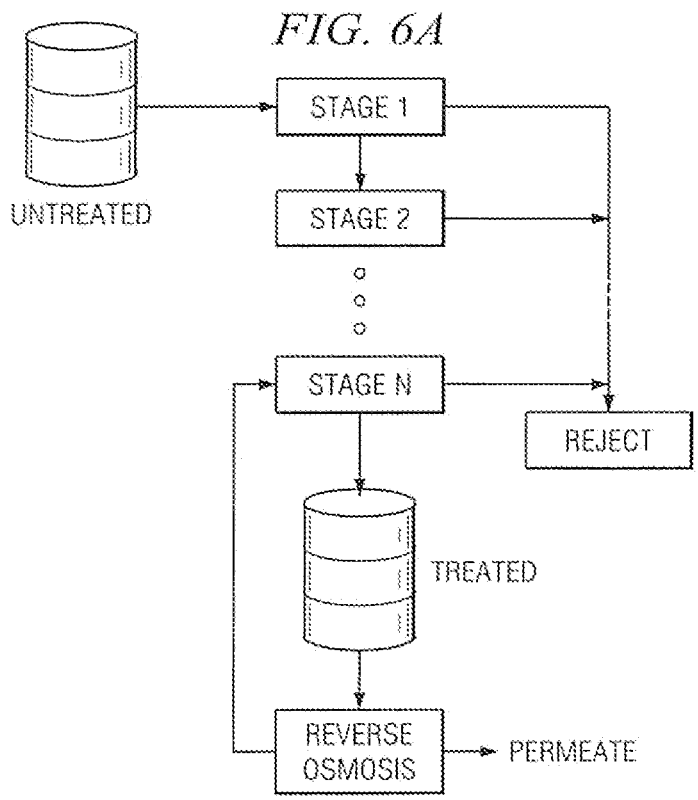
FIGS. 6A to 6C show the use of multiple stages or, passes of produced water through the apparatus (or series of apparati) in series, parallel and in combination, respectively.

FIG. 6A is a schematic diagram of one embodiment of the present invention depicting multiple treatment stages in series. With reference to FIG. 6A, untreated or produced water is passed in series through multiple separator filter pods or stages. Impurities are concentrated and collected from one or more stages into a separate receptacle. Treated water is collected at the end of the stages in series. Stages can be added as desired to further filter impurities from produced water. Each stage may contain a flux cartridge having the same porosity (e.g. five microns). Alternatively, successive stages may have successively smaller or successively larger porosities. Further, successive stages may have an apparent random variation of porosities which are selected by experimentation so as to effect a desired separation or filtration depending on the chemical and physical makeup of the produced water. For example, a first stage may use 100 micron flux cartridges while a second stage may use five micron flux cartridges. Any number of successive stages in series may be used until desired water purity is obtained. A reverse osmosis system can then be used to remove any remaining dissolved solids in the water.

Figure 6D:
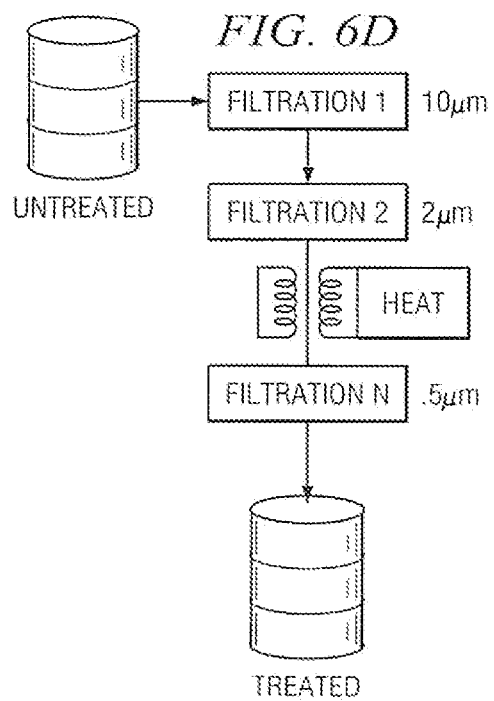
FIG. 6D shows the use of heat to improve the filtration of contaminants as it passes through the filtration stages.
Figure 6B:
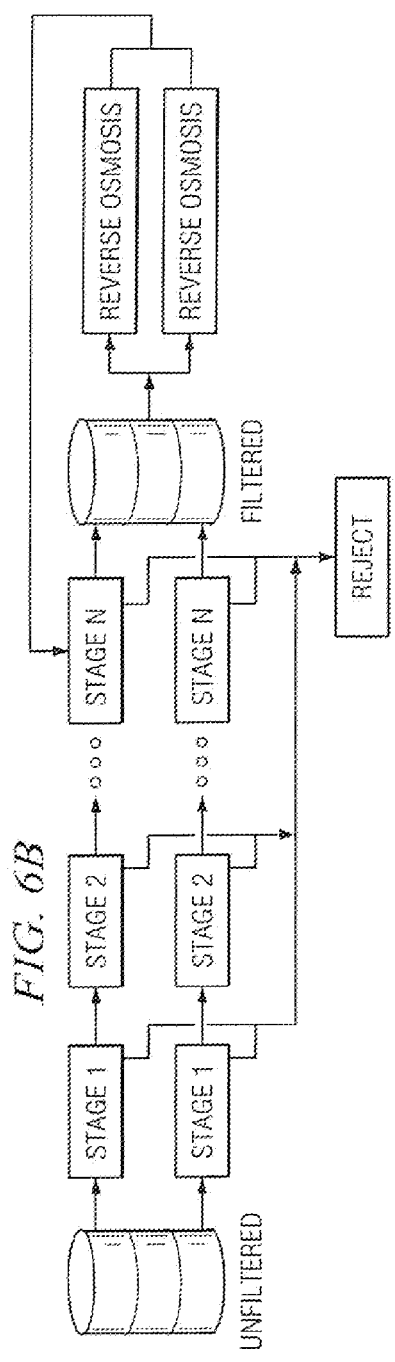

FIG. 6B is a schematic diagram of another embodiment of the present invention depicting multiple stages in series and in parallel. With reference to FIG. 6B, the capacity to filter contaminated water can be increased by adding stages in parallel. Also, the degree of filtration and resultant treated water can be similarly controlled by adding stages as desired in series. A reverse osmosis system can then be used to remove any remaining dissolved solids in the water. In one embodiment, the treated water in FIG. 6a or the filtered water in FIG. 6b can be further treated with a hydrocarbon removal media such as activated carbon and/or other suitable material such as is available from Mycelx Technologies Corporation of Gainesville, Ga., USA.

Figure 6C:
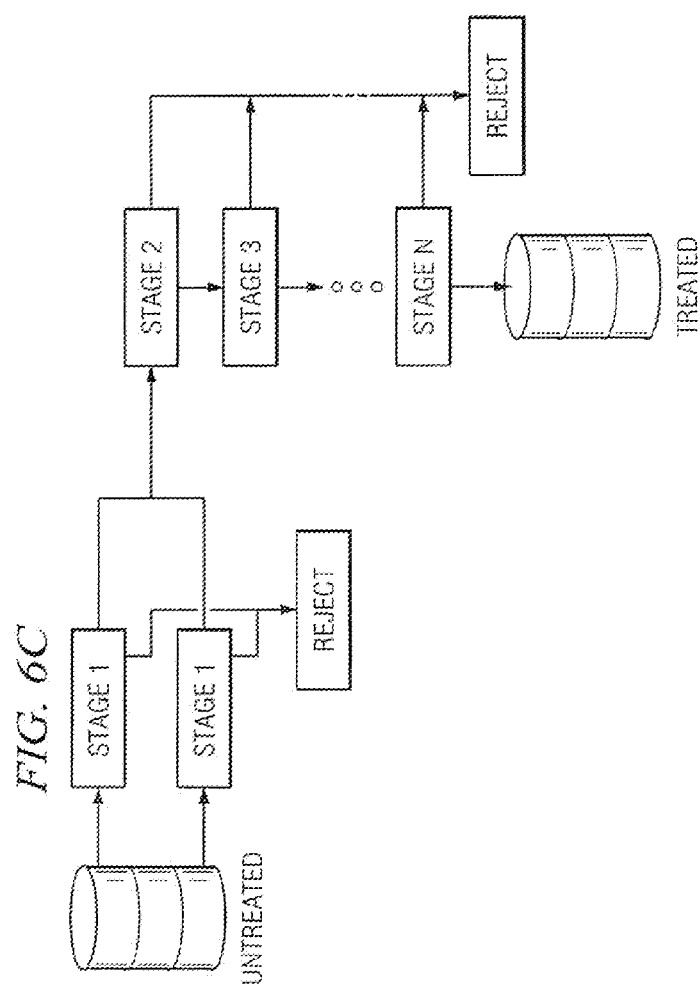

FIG. 6C is a schematic diagram of one embodiment of the present invention depicting multiple first stages in parallel and the remaining stages in series. With reference to FIG. 6C, untreated or produced water is fed into multiple filter pods at stage one before being combined and sent through a single pod for each of the remaining stages. The treated product is collected at the end of the process. The concentrated impurities are taken from stage one and from each of the stages. Any number of pods or stages, such as the arrangement shown in FIG. 6C, may be assembled into a unified functioning apparatus.

The embodiment shown in FIG. 6C is especially advantageous if there are large amounts of relatively large suspended solid impurities in the produced water which clog the pores of the first set of flux cartridges. The impurities are drawn off at the first stage by ejection cycles. Further, it may be desirable to operate the filtration and ejection cycles at a much greater frequency in the earlier stages to further ensure that particles and impurities do not excessively become bound in the pores of the flux cartridges. The filtration and ejection cycles at each stage may be performed at any rate at any given stage whether the stages are in parallel or in series.

FIG. 6D is a schematic diagram depicting a series of filter stages having decreasing filter membrane sizes and a heat source. With reference to FIG. 6D, filtration of produced water is improved by the use of heat to lower the viscosity of the aqueous solution. The lower viscosity improves the flow of fluid through the filter membranes, and especially through the smaller porosity filter membranes. Lowering the viscosity also lowers the resistivity of the fluid and permits suspended contaminants to settle out of solution where they can be more easily backflushed during an ejection cycle into a settling tank (not shown).

It should be further noted that the various streams and/or flux cartridge can also be cooled to cause contaminants such polymers or flocking agents (common constituents in drilling fluids) in the untreated water to become brittle and/or precipitate out of solution in the fluid ring. Consequently, in one embodiment, one or more of the flux cartridges comprising the first stage are cooled to precipitate out contaminants in the fluid ring. In one embodiment, the untreated fluid is cooled prior to entering the fluid ring to precipitate out components prior to entering the first separator.

Ultraviolet Disinfection

It should be further noted that other treatment technologies besides heat can also be applied in unit operations placed in before, between or after molecular separators as depicted by the heat source in FIG. 6d. For example, in one embodiment, ultraviolet radiation (UV) is used to break down organic contaminants and inhibit bacterial growth. UV disinfection transfers electromagnetic energy from a mercury arc lamp to an organism's genetic material (DNA and RNA). When UV radiation penetrates the cell wall of an organism, it destroys the cell's ability to reproduce. UV radiation, generated by an electrical discharge through mercury vapor, penetrates the genetic material of microorganisms and retards their ability to reproduce. The effectiveness of a UV disinfection system depends on the characteristics of the wastewater, the amount of time the organisms are exposed to the UV radiation, and the reactor configuration.

The optimum wavelength to inactivate organisms is in the range of 250 to 270 nm. Low pressure lamps emit essentially monochromatic light at the wavelength of 253.7 nm. Standard lengths of low pressure lamps are 0.75 m to 1.5 m with diameters of 1.5 cm to 2.0 cm. Generally, two types of UV reactor configurations exist: contact types and noncontact types. In both configurations, the fluid to be treated can flow parallel or perpendicular to the lamps. In the contact reactor, a series of mercury lamps are enclosed in quartz sleeves over which the fluid to be disinfected is routed. As the fluid passes over the lamps, UV radiation penetrates the cells of organisms suspended in the fluid and effectively "kills" the organism. In a noncontact reactor configuration, UV lamps are suspended outside a transparent fluid conduit, which carries the fluid to be disinfected. In both types of reactors, a ballast or control box, provides a starting voltage for the lamps and maintains a continuous current.

The advantages of UV disinfection include: (1) effective inactivation of most spores, viruses, and cysts, (2) UV disinfection leaves no residual effect that can be harmful to humans or aquatic life, and (3) UV disinfection has a shorter contact time when compared with other forms of disinfection (approximately 20 to 30 seconds with low-pressure lamps).

Figure 7:
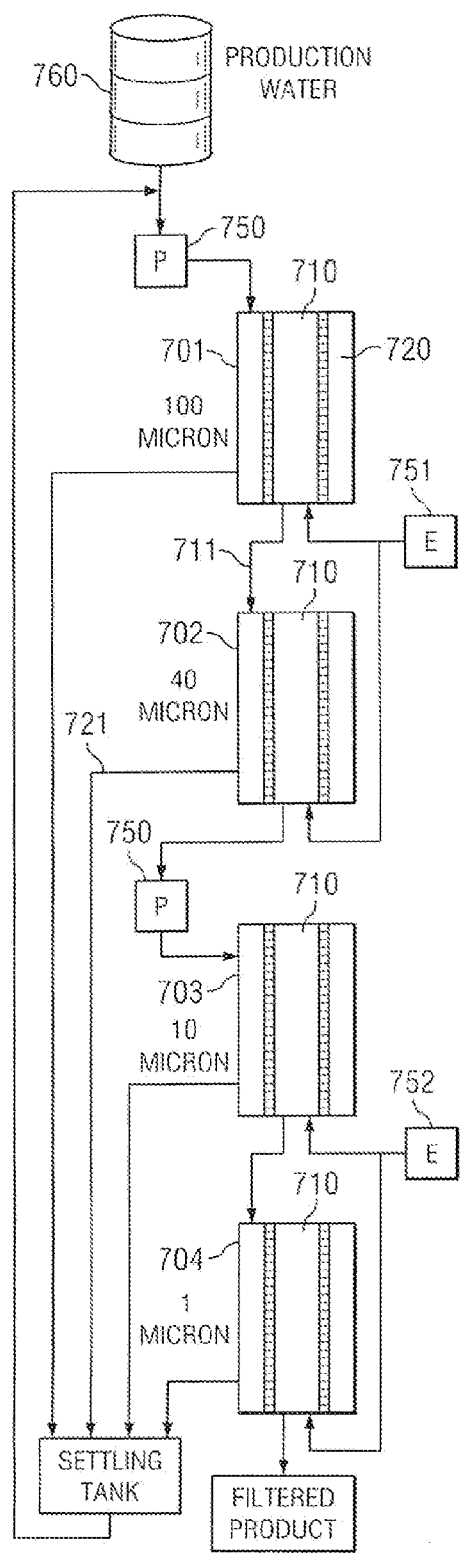
FIG. 7 is a schematic of a multi-stage filtration system wherein there is a first set of apparati in series and then a second set of apparati in parallel according to one embodiment of the present invention.
Figure 7:
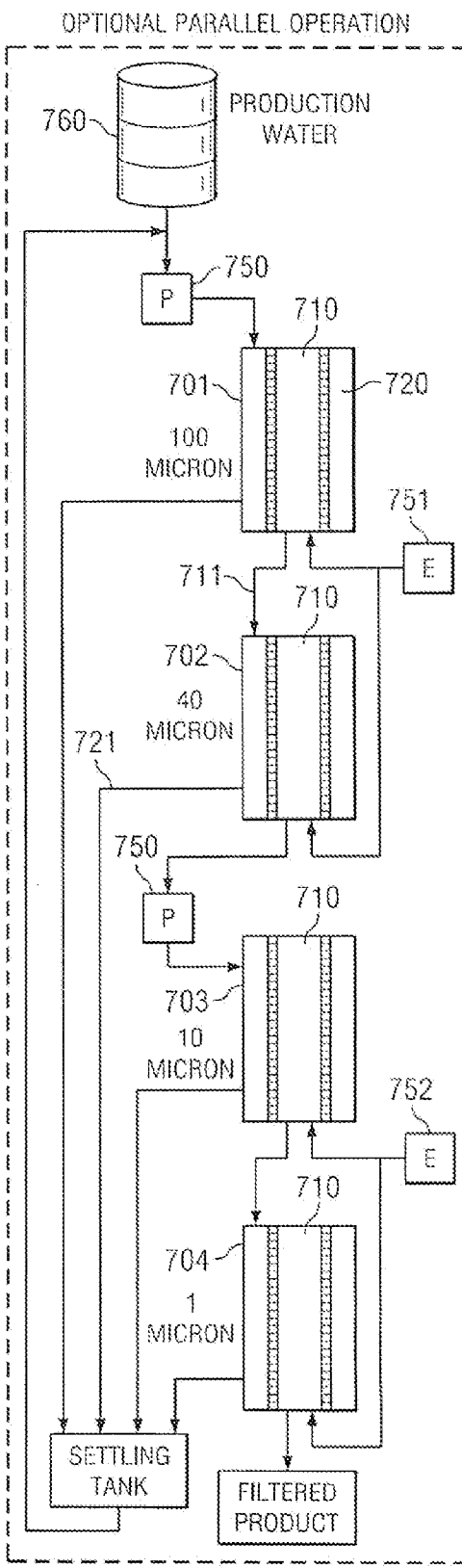

FIG. 7 is a schematic diagram of a series of four filter separator annuli 701, 702, 703, 704 each having a flux cartridge 710 in accordance with one embodiment of the present invention and illustrating the principle shown in FIG. 7. As in FIG. 2a, the annuli in FIG. 5 are for illustrative convenience and represent one or more annuli in a filter pod. Similarly, although a single series of separator annuli is illustrated in FIG. 7, several such parallel operations may work together to increase production volume as shown by the portion of FIG. 7 titled "optional parallel operation."

With reference to FIG. 7, produced or production water 760 is routed by a pump (P) 750 to a first filter annulus 701 and flux cartridge 710 having an effective porosity of 100 microns. A fluid ring 720 exists between the inside surface of each annuli 701, 702, 703, 704 and the outer surface of its corresponding flux cartridge 710. The effluent 711 from the first flux cartridge 710 passes into a second filter annulus 702 wherein it is further treated with a second flux cartridge 710 having an effective porosity of 40 microns. A second pump 750 passes the treated effluent from the second annulus 702 into the third annulus 703 wherein the fluid is treated a third time through a flux cartridge 710 having an effective porosity of 10 microns. Finally, the treated effluent from the third annulus 703 is passed into the fourth annulus 704 wherein its flux cartridge has an effective porosity of one micron.

In the embodiment shown, the pumps (P) 750 and ejectors (E) 751, 752 pneumatically operate at different time intervals that cycle between a filtration cycle (when the pumps P are operating) and an ejection cycle (when the ejectors E are operating). For example, the filtration cycle can occur for a pre-determined amount of time and at the end of this pre-determined amount of time, each separator unit or Q-pod can be backwashed with a reverse flush from the ejector E as explained in regard to FIG. 2a. In alternative embodiments, variables with or without time can be used to determine the length of each cycle interval. One such variable may be an average pressure differential that develops across the flux cartridges 710 of each Q-pod. In one embodiment, the filtration cycle causes an average pressure drop across the flux cartridge membrane of between about 30 and 50 psi (0.2 and 0.35 MPa) and the ejection cycle causes an average pressure drop across the flux cartridge of between about 100 and 300 psi (0.7 and 2.0 MPa). Vigorous backwash forces refresh each flux cartridge and help maintain the turbulent fluid dynamics occurring within the fluid ring of each filter unit. The filtration cycles and ejection cycles can be optimized based upon the amounts and types of contaminants in the produced water.

FIGS. 8A-8E are tables of measured properties of actual fluid streams as they are processed or treated through four stages or "passes" of one embodiment of the present invention. Four Q-pods are used in parallel at each stage. A pump forces the effluent from each stage to the next successive stage. The pressure measurements recorded for these pods are taken during all phases of the filtration process. During a filtering cycle, the inside Q-pod pressure is normally less than the outside Q-pod pressure indicating a pressure drop across the filter membrane or flux cartridge. In FIGS. 8B-8E, the inside pressure of a particular Q-pod may be the same or more than its corresponding outside pressure. In this case, the particular Q-pod may be in a backwash cycle. During a filtering cycle, the inside Q-pod pressure may be less than the outside Q-pod pressure.

FIG. 8A illustrates the properties of a sample of produced water before being treated. The untreated sample has a nephelometric turbidity measurement is 3 NTU. Its total dissolved solids (TDS) measurement is 9.02 ppt or parts per thousand. Its pH is 8.72, its temperature is 32 deg. C., and its conductivity is 17.91 mS or milli-siemens. Its specific gravity is 1.008 and its chloride concentration or "chlorides" is 15,180 ppm or parts per million.

FIG. 8B illustrates these same properties for the two fractions exiting from the first parallel set of four pods. These pods each have a 100 micron flux cartridge and together have treated 70 gallons of the produced water or "start sample" of FIG. 7A. The values for the product or treated stream are about the same as for the start sample except that the conductivity has risen to 18.29 mS and the chlorides have dropped to 12,375 ppm. On the other hand, the values for the reject stream reflect some increased concentration of contaminants. Specifically, the reject stream turbidity has risen to 15 NTU. However, the chlorides have also been reduced from 15,180 to 13,200 ppm. This phenomenon is at least partly due to the induced chemical reactions from the fluid turbulence and hydrodynamic cavitation occurring in each pod.

FIG. 8C illustrates the same properties for the two fractions exiting from the second parallel set of four pods. These pods each have a 40 micron flux cartridge and together have treated 70 gallons of the treated or product stream from the first pass or stage shown in FIG. 7B. The TDS for both product and reject streams has dropped to 8.29 and 8.23 ppt, respectively. The conductivity for both product and reject streams has dropped to 16.38 and 16.50 mS, respectively. Similarly, the chlorides for both product and reject streams has dropped to 8,413 and 8,520 ppm, respectively. After two stages, the product stream turbidity has remained at or near 3 NTU while the reject stream has been concentrated to 16 NTU.

FIG. 8D illustrates the same properties for the two fractions (product and reject) exiting from the third parallel set of pods. These four pods each have a 10 micron flux cartridge and have treated the product stream as shown in FIG. 7C. The TDS for both product and reject streams has remained relatively constant at 8.41 and 8.43 ppt, respectively. The conductivity likewise has remained relatively constant at 16.89 and 16.83 mS, respectively. Remarkably, after three stages, the product stream turbidity has remained at or near 3 NTU while the reject stream turbidity has been further concentrated to 32 NTU.

FIG. 8E illustrates the same properties for the two fractions (product and reject) exiting from the fourth and final parallel set of pods. These four pods each have a one micron flux cartridge and have treated the product stream as shown in FIG. 8D. The TDS for both product and reject streams has increased to 10.6 and 10.7 ppt, respectively. The conductivity likewise has increased to 21.2 and 21.2 mS, respectively. The specific gravity for both product and reject streams has increased to 1.006 and 1.006, respectively. The chlorides have further decreased to 8,307 and 7,987, respectively. The pH for both product and reject streams has decreased from the value measured from the start sample to 8.47 and 8.39, respectively. After four stages, the product stream turbidity has dropped to 2 NTU while the reject stream turbidity has been further concentrated to 33 NTU.

The changes in these properties from beginning to end of the process indicate that the product stream has been purified from contaminants and the reject stream has been enriched with contaminants. Further, the chemical makeup of the contaminants in both streams has been changed as indicated by the change in values of TDS, pH, conductivity, specific gravity, and chlorides present.

In a further embodiment, the filter membrane or flux cartridge can comprise a catalyst (e.g. cobalt-molybdenum, alumina, aluminosilicate zeolite, palladium, platinum, nickel, rhodium) to decontaminate some of the impurities in produced water. Such catalyst should be selected so as to target a particular chemical compound or element, or set of chemical species.

In another embodiment, a heated or non-heated gaseous stream can be used to aerate the produced water or any of the streams in the process. Such aeration may occur before any filtration, at any stage of filtration, or between stages of filtration. Such additional gaseous stream further aids in filtration and separation of contaminants from the water. Oxygen or other gaseous species chemically reacts with the contaminants further improving the quality of the treated aqueous product. For example, a heated air, oxygen stream, or hydrogen stream can be added at any stage to the aqueous stream being treated. The examples of heated and non-heated gases are provided for purposes of illustration and not limitation.

The instant invention results in numerous advantages. First, it provides an efficient method for cleaning or filtering produced water to the point where it may be potable or may be further treated to become potable. Such invention reduces the cost of treating contaminated water and/or generating cleaner, usable water. Second, the invention provides a way to clean produced water such that the effluent complies with environmental standards. Such cleansed water may be safely released to the surface or re-injected back into the ground, and the contaminants may be further concentrated and can then be more appropriately disposed of or used. Third, the invention can help to provide a more stable feed stock to other processes requiring a cleaner low-cost aqueous stream. Fourth, the invention can be portable and skid-mounted and can be placed near a well head and filter water wherever needed. Pumping costs are thereby reduced as contaminants are removed closer to the source of contamination. Fifth, it provides for a more economical overall filtration operation.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only. While the invention has been particularly shown and described with reference to a preferred embodiment, it will be understood by those skilled in the art that various changes in form and detail may be made therein without departing from the spirit and scope of the invention.

I claim:

1. A separator apparatus for treating wastewater, comprising:
   at least one separator with at least one annulus disposed therein;
   a flux cartridge with a semi-permeable membrane seated inside said annulus, wherein a fluid ring exists between an interior surface of the annulus and an exterior surface of the flux cartridge;
   a first pump in fluid communication with the separator capable of delivering an influent fluid containing at least one contaminant into the separator, wherein the rhythmic pressure delivered by the first pump causes turbulence-induced cavitation within the fluid ring of the separator which results in the retention of contaminant particles on the exterior surface of the flux cartridge and the collection of the filtered fluid within an interior chamber of the flux cartridge wherein the first pump pumps contaminated fluid influent into the separator through two alternating fluid paths, wherein the fluid influent is moved through the first path by the upward movement of a piston inside the first pump and is moved through the second fluid path by the downward movement of said piston;
   a second pump in fluid communication with the separator capable of reversing the flow of fluid through the flux cartridge, wherein filtered fluid is pumped into the fluid ring from the interior chamber of the flux cartridge which provides for the removal of the contaminant particles retained by the flux cartridge and transports a substantial portion of the contaminant particles out of the separator;
   a reject tank in fluid communication with the separator which receives a substantial portion of the contaminant particles from the separator; and
   a product tank which receives a substantial portion of the filtered fluid from the separator.

2. The apparatus according to claim 1, further comprising:
   at least one concentrator in fluid communication with the separator, containing at least one concentrator annulus disposed therein; and,
   a concentrator flux cartridge with a semi-permeable membrane seated inside the concentrator annulus, wherein a fluid ring exists between the interior surface of the annulus and the exterior surface of the flux cartridge, wherein a substantial portion of the contaminant waste and fluid flushed from the separator enters the interior chamber of the flux cartridge seated within the concentrator and wherein the contaminant of a desired dimension is retained on the interior surface of the concentrator flux cartridge and a substantial portion of the filtered fluid is collected in the fluid ring of the concentrator.

3. The apparatus according to claim 1 further comprising a plurality of separators which are operated in at least one of a series or parallel configuration.

4. The apparatus according to claim 1, further comprising:
   a reverse osmosis membrane in fluid communication with the separator.

5. The apparatus according to claim 1 wherein at least one flux cartridge is impregnated with a biocide.

6. The apparatus according to claim 1 wherein at least one flux cartridge comprises an electrochemical cell.

7. The apparatus according to claim 1 wherein at least one flux cartridge is subjected to a magnetic force upon entry into the fluid ring of the separator.

8. The apparatus according to claim 1 wherein at least one flux cartridge is coupled with an ultrasonic wave source.

9. The apparatus of claim 1 further comprising:
   at least one transition plate in fluid communication with the separator for distributing the influent fluid stream into the separator.

10. The apparatus according to claim 1, further comprising:
    a slipstream fluid path in fluid communication with the separator which acts to enhance the turbulent flow of contaminated influent within the separator thereby improving the filtration efficiency of the separator.

11. The apparatus according to claim 1 further comprising a control panel which includes a plurality of control inputs for monitoring and operating the molecular separator apparatus by a user.

12. The apparatus according to claim 1 further comprising:
    a hydrocarbon removal unit in fluid communication with the separator.

13. The apparatus according to claim 1 further comprising:
    a heat source in fluid communication with the separator.

14. The apparatus according to claim 1 further comprising:
    an ultraviolet disinfection source in fluid communication with the separator.

15. The apparatus according to claim 1 wherein at least one poppet valve controls the flow of fluid into the separator.

16. The apparatus according to claim 1 wherein a plurality of poppet valves are cycled incrementally to control the flow of fluid through the separator.

17. The apparatus of claim 1 wherein the molecular separator is detachably secured to a wheeled transport.

18. The apparatus of claim 1 wherein said flux cartridge comprises a reusable filter.

19. A separator apparatus for treating wastewater, comprising:
    at least one separator with at least one annulus disposed therein;

a flux cartridge with a semi-permeable membrane seated inside said annulus, wherein a fluid ring exists between an interior surface of the annulus and an exterior surface of the flux cartridge;

a first pump in fluid communication with the separator capable of delivering an influent fluid containing at least one contaminant into the separator, wherein the rhythmic pressure delivered by the first pump causes turbulence-induced cavitation within the fluid ring of the separator which results in the retention of contaminant particles on the exterior surface of the flux cartridge and the collection of the filtered fluid within an interior chamber of the flux cartridge;

a second pump in fluid communication with the separator capable of reversing the flow of fluid through the flux cartridge, wherein filtered fluid is pumped into the fluid ring from the interior chamber of the flux cartridge which provides for the removal of the contaminant particles retained by the flux cartridge and transports a substantial portion of the contaminant particles out of the separator wherein only one separator is in fluid communication with the second pump and wherein the flow of fluid received from the second pump is alternated between a plurality of separators at regular intervals and the treated fluid from the plurality of separators that are not in fluid communication with the second pump bypass the second pump and flow directly into a collection reservoir;

a reject tank in fluid communication with the separator which receives a substantial portion of the contaminant particles from the separator; and a product tank which receives a substantial portion of the filtered fluid from the separator.

* * * * *